(12) United States Patent
Grubic et al.

(10) Patent No.: US 10,504,656 B2
(45) Date of Patent: Dec. 10, 2019

(54) ELECTRODES FOR LINEAR SWITCHED CAPACITIVE DEVICES

(71) Applicant: General Electric Company, Schenectady, NY (US)

(72) Inventors: Stefan Grubic, Albany, NY (US); Nathaniel Benedict Hawes, Milton, NY (US); Manoj Ramprasad Shah, Latham, NY (US); Martin Kin-Fei Lee, Niskayuna, NY (US); Rui Zhou, Niskayuna, NY (US); Kevin Michael Grace, Halfmoon, NY (US); Qin Chen, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 862 days.

(21) Appl. No.: 14/699,234

(22) Filed: Apr. 29, 2015

(65) Prior Publication Data
US 2016/0322165 A1 Nov. 3, 2016

(51) Int. Cl.
*H01G 5/14* (2006.01)
*H01G 5/013* (2006.01)

(52) U.S. Cl.
CPC ............. *H01G 5/14* (2013.01); *H01G 5/0136* (2013.01)

(58) Field of Classification Search
CPC ............................... H01G 5/14; H01G 5/0136
(Continued)

(56) References Cited

U.S. PATENT DOCUMENTS 3,400,282 A * 9/1968 Felici ................... G01P 15/125
310/300
3,588,640 A * 6/1971 Fabricius ...................... 361/293
(Continued)

FOREIGN PATENT DOCUMENTS

CN 103368452 A 10/2013
JP H1187172 A 3/1999
(Continued)

OTHER PUBLICATIONS

Matsuzaki et al., "Comparison of Electrostatic and Electromagnetic Motors Based on Fabrication and Performance Criteria",Micro Machine and Human Science, 1994. Proceedings., 1994 5th International Symposium , Issue Date : Oct. 2-4, 1994, Print ISBN: 0-7803-2095-6.
(Continued)

*Primary Examiner* — Bickey Dhakal
*Assistant Examiner* — Devon A Joseph
(74) *Attorney, Agent, or Firm* — Armstrong Teasdale LLP

(57) ABSTRACT

A switched capacitive device includes a stationary portion including a plurality of first electrodes extending at least partially in a longitudinal dimension. Each first electrode has a first substantially active electrode volume. The device also includes a translatable portion including a plurality of second electrodes proximate the plurality of first electrodes. Each second electrode has a second substantially active electrode volume. The first active electrode volume is greater than the second active electrode volume. The second electrodes are translatable with respect to the first electrodes. The second electrodes extend at least partially in the longitudinal dimension. The first electrodes are configured to induce substantially linear motion of the second electrodes in the longitudinal dimension through the use of an electric field induced by at least a portion of the first electrodes.

23 Claims, 13 Drawing Sheets

(58) Field of Classification Search
USPC .......................................................... 318/662
See application file for complete search history.

(56) References Cited

U.S. PATENT DOCUMENTS

| | | | |
|---|---|---|---|
| 4,127,804 A | 11/1978 | Breaux | |
| 4,546,292 A | 10/1985 | Audren et al. | |
| 4,595,852 A | 6/1986 | Gundlach | |
| 4,760,302 A * | 7/1988 | Jacobsen | H02N 1/004 310/12.28 |
| 4,943,750 A | 7/1990 | Howe et al. | |
| 4,997,521 A * | 3/1991 | Howe | H02N 1/004 216/17 |
| 5,262,695 A | 11/1993 | Kuwano et al. | |
| 5,541,465 A * | 7/1996 | Higuchi | H02N 1/004 310/268 |
| 5,928,791 A | 7/1999 | Rosenmayer | |
| 6,168,948 B1 | 1/2001 | Anderson et al. | |
| 6,184,607 B1 * | 2/2001 | Cabuz | H02N 1/006 310/309 |
| 6,353,276 B1 * | 3/2002 | Gendron | H02N 1/004 310/309 |
| 6,359,757 B1 * | 3/2002 | Mallary | G11B 5/5552 137/1 |
| 6,373,682 B1 * | 4/2002 | Goodwin-Johansson | H01H 59/0009 361/278 |
| 6,530,217 B1 * | 3/2003 | Yokota | F15B 21/065 60/326 |
| 6,771,002 B2 | 8/2004 | Jones | |
| 6,781,284 B1 | 8/2004 | Pelrine et al. | |
| 6,881,250 B2 | 4/2005 | Wong et al. | |
| 7,088,567 B2 | 8/2006 | Hunt et al. | |
| 7,091,648 B2 * | 8/2006 | Gondoh | H02N 1/004 310/309 |
| 7,115,161 B2 | 10/2006 | Magdassi et al. | |
| 7,304,410 B2 * | 12/2007 | Odaka | H02N 1/004 310/309 |
| 7,452,143 B2 * | 11/2008 | Matsuki | H02N 1/004 348/E5.028 |
| 7,781,935 B2 * | 8/2010 | Jager | H02N 1/08 310/309 |
| 7,877,231 B2 * | 1/2011 | Bharadwaj | G05B 19/4065 700/21 |
| 8,013,667 B2 | 9/2011 | Ikehashi | |
| 8,278,797 B2 | 10/2012 | Sashida | |
| 8,483,017 B2 * | 7/2013 | Bisig | G04C 3/08 368/157 |
| 8,580,384 B2 * | 11/2013 | Zheng | C08G 63/912 428/411.1 |
| 8,618,715 B2 * | 12/2013 | Shimanouchi | H01G 5/18 310/309 |
| 8,710,793 B2 * | 4/2014 | Despesse | H01G 5/18 320/103 |
| 9,748,867 B2 * | 8/2017 | Hawes | H02N 1/004 |
| 2004/0264107 A1 | 12/2004 | Hunt | H01G 5/0132 361/327 |
| 2005/0253481 A1 * | 11/2005 | Koga | H02N 1/004 310/309 |
| 2006/0214535 A1 * | 9/2006 | Salmon | H02N 1/004 310/309 |
| 2008/0094076 A1 * | 4/2008 | Hibbs | G01N 33/48728 324/686 |
| 2009/0201623 A1 * | 8/2009 | Steeneken | H01H 59/0009 361/290 |
| 2010/0085843 A1 * | 4/2010 | Bisig | H02N 1/008 368/160 |
| 2012/0055768 A1 * | 3/2012 | Reimann | H01G 5/011 200/181 |
| 2013/0106317 A1 * | 5/2013 | Ludois | H02N 1/00 318/116 |
| 2013/0256274 A1 * | 10/2013 | Faulkner | H01H 33/16 218/143 |
| 2013/0300252 A1 * | 11/2013 | Johnson | H02N 1/004 310/309 |
| 2014/0175941 A1 * | 6/2014 | Johnson | H02N 1/006 310/309 |
| 2015/0134109 A1 * | 5/2015 | Zhou | H02N 1/006 700/245 |
| 2016/0322918 A1 * | 11/2016 | Chen | H01B 3/24 |
| 2017/0338750 A1 * | 11/2017 | Ge | H02N 1/002 |

FOREIGN PATENT DOCUMENTS

| | | |
|---|---|---|
| JP | 2012023839 A | 2/2012 |
| WO | 2013168191 A1 | 11/2013 |

OTHER PUBLICATIONS

Niino, T. et al., "Electrostatic Artificial Muscle: Compact, High-Power Linear Actuators with Multiple-Layer Structures," Proceedings IEEE Micro Electro Mechanical Systems an Investigation of Micro Structures, Sensors, Actuators, Machines and Robotic Systems, Jan. 25-28, 1994, pp. 130-135; Print ISBN:0-7803-1833-1.

Cooney, Michael, "DARPA program targets 20-fold increase in robot range, endurance," NetworkWorld.com Community, created Jul. 5, 2012, retrieved from website www.networkworld.com/community/print/80972.

Buehler, Martin. Dynamic locomotion with one, four and six-legged robots. McGill Univ Montreal (Quebec), 2005.

Philp, Sanborn F. "The vacuum-insulated, varying-capacitance machine." Electrical Insulation, IEEE Transactions on 2 (1977): 130-136.

O'Donnell, R. J., et al. "The variable-capacitance machine for off-shore wind generation." (2006): 131-135.

Singh, S. P., Bhim Singh, and M. P. Jain. "Performance characteristics and optimum utilization of a cage machine as capacitance excited induction generator." Energy Conversion, IEEE Transactions on 5.4 (1990): 679-685.

Bakri-Kassem et al., "A parallel-plate MEMS variable capacitor with vertical thin-film comb actuators", Microwave Conference, 2007. European, IEEE Xplore, pp. 1349-1352, Conference Location: Munich, Oct. 9-12, 2007.

Niino T et al., "Dual excitation multiphase electrostatic drive", Industry Applications Conference, 1995. Thirtieth IAS Annual Meeting, IAS '95., Conference Record of the 1995 IEEE, IEEE Xplore, pp. 1318-1325, vol. 2, Conference Location: Orlando, FL, Oct. 8-12, 1995.

"High Power Electrostatic Motor", Shinsei Corporation, downloaded from "http://www.shinsei-motor.com/English" on Jan. 7, 2014 (7 pgs).

Akio Yamamoto et al., "Modeling and identification of an electrostatic motor", Precision Engineering, pp. 104-113, vol. 30, Issue: 1, Jan. 2006.

Chaput, Simon, et al. "A 3.7 V to 200 V highly integrated DC-DC converter with 70.4% efficiency for portable electrostatic MEMS applications." New Circuits and Systems Conference (NEWCAS), 2014 IEEE 12th International. IEEE, 2014.

* cited by examiner

ELECTRODES FOR LINEAR SWITCHED CAPACITIVE DEVICES

STATEMENT REGARDING FEDERALLY SPONSORED RESEARCH & DEVELOPMENT

This invention was made with Government support under contract number W31P4Q-13-C-0095 awarded by the Defense Advanced Research Projects Agency (DARPA). The Government has certain rights in this invention.

BACKGROUND

The field of the disclosure relates generally to actuators and motors and, more particularly, to linear switched capacitance actuators and motors.

Many known motors/actuator devices use magnetic fields as a force transfer mechanism rather than electric fields due to the higher energy densities achieved with magnetic fields using conventional materials and configurations. Such known devices are sometimes referred to as electromechanical actuators (EMAs). At least some of these EMAs include at least one electric motor as a driving device, such motor coupled to one of an alternating current (AC) power source and/or a direct current (DC) power source. Some of these known motor-driven EMAs may also include a power transfer device, e.g., a geared transmission or a direct drive shaft. The motor may be powered through power electronics, e.g., insulated-gate bipolar transistors (IGBTs) to facilitate increases in operational efficiency or implement complex control tasks. Many other known EMAs are hydraulically-driven and include an accumulator and a hydraulic pump/motor combination. Such known EMAs are used extensively for operation of larger devices such as valves and dampers. However, they have some disadvantages for smaller applications, such as operation of robot translatables and aviation devices.

At least some other known motors and actuators use electric fields rather than magnetic fields for electro-mechanical energy transfer. A switched capacitance actuator (SCA) is an electric field-based device that demonstrates an improved energy density over earlier electric field-based devices. The electro-mechanical energy conversion is at least partially a result of the change in the device capacitance with respect to rotor translation. Such SCAs are electrostatic motors that include a translatable portion, e.g., a rotor and a stationary portion, e.g., a stator and operate in a manner similar to the magnetic field equivalent of the SCA, a switched reluctance motor (SRM). Both the rotor and stator include multiple electrodes that correspond to magnetic poles in a SRM. When voltage is applied to a stator capacitor electrode pair, a rotor electrode will induce rotation in the rotor to align with the stator capacitor electrode pair. When the voltage on this stator electrode pair is removed, the appropriate next stator electrode pair that is not aligned with the rotor electrode is energized with a voltage to continue the rotational motion. Thus an external switching circuit is required to switch the stator excitation, though the machine may be configured to operate synchronously with three-phase sinusoidal excitation.

Such SCAs offer advantages over magnetic EMAs in that continuous electric current is not required to generate torque, thereby decreasing overall power consumption. Also, many standard components of magnetic EMAs, e.g., an iron core-type as a magnetic conductor and a yoke (or equivalent) are not required. Also, such SCAs require much less copper conductor. As such, the size, weight, efficiency, and cost of SCAs may be much lower than those for magnetic EMAs. The improved efficiency is also partially due to the decrease in losses of the SCAs which include thermal, mechanical, and electromagnetic losses. Since the copper losses in the SCA are smaller than in conventional machines and the dielectric losses can be held small compared to iron losses, the efficiency of SCAs is improved.

However, such known SCAs do not match electromagnetic machines with respect to the motion inducing shear stress, i.e., total force or torque output per unit rotor surface area. Typically, magnetically coupled actuators have gravimetric power densities below 1 kiloWatt per kilogram (kW/kg). In comparison, typical hydraulic actuators have gravimetric power densities on the order of 3-5 kW/kg, however, such typical hydraulic actuators have low efficiencies. Therefore, to attempt to achieve parity with electromagnetic devices with respect to power-to-weight ratio, at least some known SCAs compensate for the relatively lower shear stress by increasing the active area of the air gap defined by the SCA rotor and stator. According to Gauss' divergence theorem, electric field lines are not required to define closed field loops, in contrast, magnetic field lines form closed loops that originate and terminate on the magnet. Since the electric field lines do not need to be closed, the rotor surface area may be increased by adding active layers. Another strategy to increase the power-to-weight ratio is to increase the shear stress by improving the dielectric breakdown strength within the gap of the SCA. For example this may be achieved through evacuating the SCA casing. The dielectric breakdown strength of vacuum is much higher than that of air, which facilitates the strength of the electric fields in the gap to be larger. However, the evacuation configuration increases the complication of the SCA since the device needs to be securely sealed with a vacuum pump. Such a configuration is difficult to implement in robotic and aviation applications, at least partially due to size and weight constraints.

BRIEF DESCRIPTION

In one aspect, a switched capacitive device is provided. The switched capacitive device includes a stationary portion including a plurality of first electrodes extending at least partially in a longitudinal dimension. Each first electrode of the plurality of first electrodes has a first substantially active electrode volume. The switched capacitive device also includes a translatable portion including a plurality of second electrodes proximate the plurality of first electrodes. Each second electrode of the plurality of second electrodes has a second substantially active electrode volume. The first substantially active electrode volume is greater than the second substantially active electrode volume. The plurality of second electrodes is translatable with respect to the plurality of first electrodes. The plurality of second electrodes extend at least partially in the longitudinal dimension. The plurality of first electrodes are configured to induce substantially linear motion of the plurality of second electrodes in the longitudinal dimension through the use of an electric field induced by at least a portion of the plurality of first electrodes.

In a further aspect, a machine is provided. The machine includes a body and at least one electric power source coupled to the body. The machine also includes at least one mechanism translatably coupled to the body at least one switched capacitive device configured to induce movement of the at least one mechanism. The at least one switched capacitive device includes a stationary portion including a plurality of first electrodes extending at least partially in a longitudinal dimension. Each first electrode of the plurality of first electrodes has a first substantially active electrode volume. The switched capacitive device also includes a translatable portion including a plurality of second electrodes proximate the plurality of first electrodes. Each second electrode of the plurality of second electrodes has a second substantially active electrode volume. The first substantially active electrode volume is greater than the second substantially active electrode volume. The plurality of second electrodes is translatable with respect to the plurality of first electrodes. The plurality of second electrodes extend at least partially in the longitudinal dimension. The plurality of first electrodes are configured to induce substantially linear motion of the plurality of second electrodes in the longitudinal dimension through the use of an electric field induced by at least a portion of the plurality of first electrodes.

In another aspect, a method for converting electrical energy into mechanical energy through a switched capacitive device is provided. The switched capacitive device includes a stationary portion and a translatable portion proximate the stationary portion. The switched capacitive device defines a longitudinal dimension. The stationary portion includes a plurality of first electrodes extending at least partially in the longitudinal dimension. The translatable portion includes a plurality of second electrodes proximate, complementary with, and in opposition to the plurality of first electrodes. The plurality of second electrodes is translatable with respect to the plurality of first electrodes. The plurality of second electrodes extends at least partially in the longitudinal dimension. The method includes energizing at least a portion of the plurality of first electrodes. Each first electrode of the plurality of first electrodes has a first substantially active electrode volume. The method also includes inducing an electric field about the at least a portion of the first plurality of electrodes. The electric field is further induced about at least a portion of the plurality of second electrodes. Each second electrode of the plurality of second electrodes has a second substantially active electrode volume. The first substantially active electrode volume is greater than the second substantially active electrode volume. The method further includes inducing linear motion of the translatable portion in the longitudinal direction as a function of the electric field induced by at least a portion of the plurality of first electrodes.

DRAWINGS

These and other features, aspects, and advantages of the present disclosure will become better understood when the following detailed description is read with reference to the accompanying drawings in which like characters represent like parts throughout the drawings, wherein.

Figure 1:
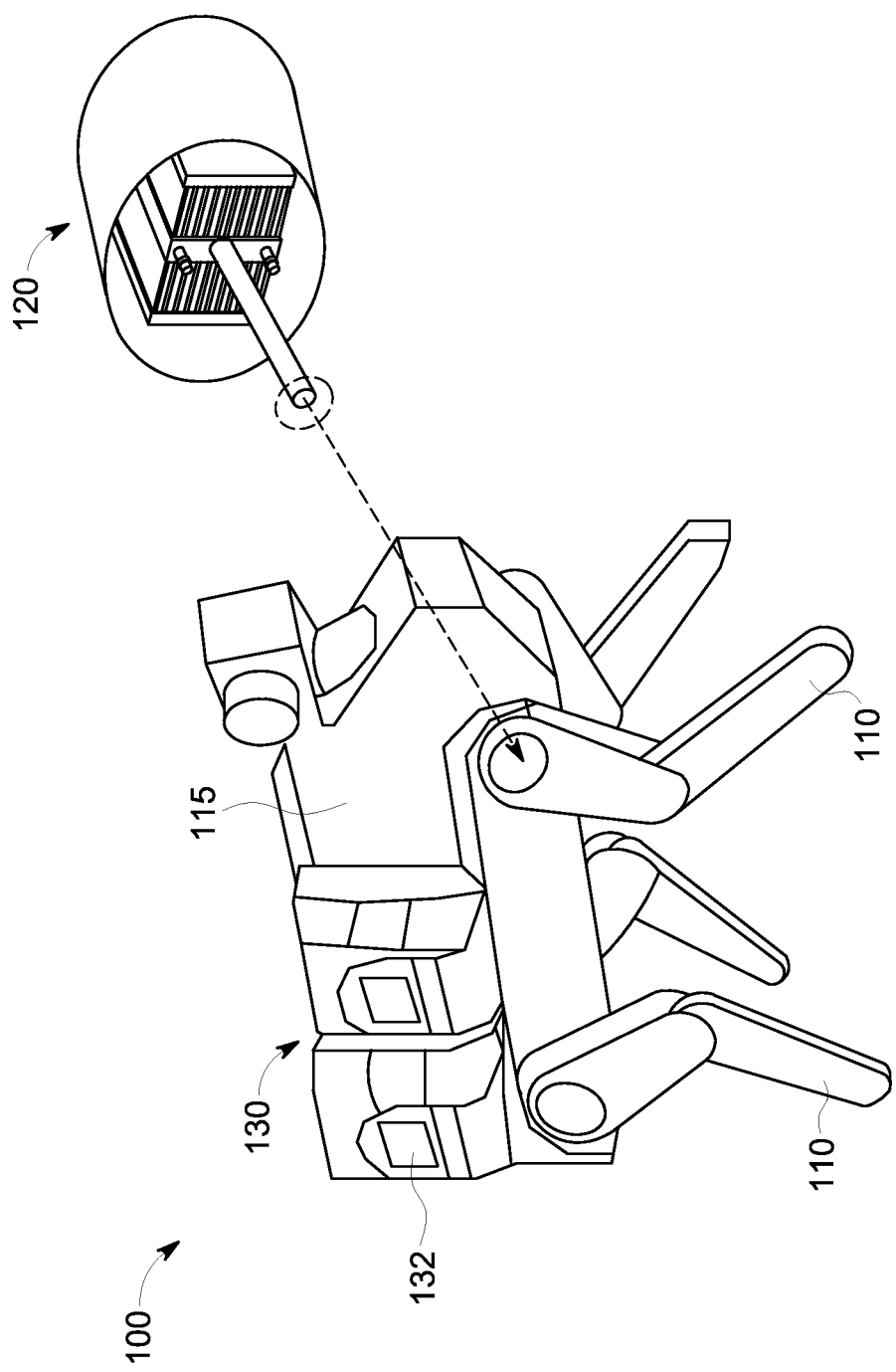
FIG. 1 is a schematic view of an exemplary robotic device that includes exemplary robotic translatables that each include an exemplary switched capacitive actuator (SCA)

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The switched capacitive devices described herein provide a cost-effective method for increasing the energy efficiency of the associated devices and systems. Specifically, in order to achieve higher total energy efficiency for the actuation systems embedded within those systems, a high power switched capacitance actuator (SCA) is used. More specifically, operation of the disclosed SCAs is based on a spatial change of electric fields rather than based on magnetic fields which are used in some conventional EMAs. The SCAs described herein offer advantages over electromagnetic machines that include, without limitation, sufficient torque generation without using continuous current, removing the requirement of using an iron core as a magnetic conductor, eliminating the need for a yoke, and significantly decreasing the amount of copper in the actuators, thereby decreasing the size, weight, and costs of the actuators. Also, specifically, the SCAs described herein are linear, direct drive SCAs without a transmission gear. Therefore, the embodiments described herein further facilitate decreasing the weight of actuation systems used in mobile and/or translatable machines.

In addition, the SCAs described herein provide for an improved efficiency over that of electromagnetic machines because the losses of the system which include thermal, mechanical, and electromagnetic losses are lower. Specifically, the copper losses in the SCA are smaller than in conventional machines and the dielectric losses can be held small compared to iron losses. Due to the lighter weight and decreased losses, the SCAs described herein demonstrate a high gravimetric power density, i.e., a high power-to-weight ratio. As such, the SCAs described herein provide a light weight, high efficiency linear actuator for applications where the gravimetric power density of the actuator is critical, for example, and without limitation, robotics, aviation, automotive, and wind power applications. Moreover, the SCAs described herein use printed circuit boards to generate the translational forces, thereby increasing the ease of fabrication and assembly of the SCAs while reducing costs.

FIG. 1 is a schematic view of an exemplary machine, and more specifically, a robotic device, i.e., a legged robot 100 that includes exemplary translatable mechanisms, i.e., robotic translatables 110 in the form of translatable legs coupled to a robot body 115. In the exemplary embodiment, four translatables 110 are shown. Alternatively, robotic device 100 includes any number of translatables 110 that enables operation of robotic device 100 as described herein. Each of robotic translatables 110 includes a switched capacitive device, i.e., a switched capacitance actuator (SCA) 120. Legged robot 100 also includes an independent electric power supply system 130 coupled to robot body 115. In the exemplary embodiment, system 130 is a plurality of direct current (DC) batteries 132. Batteries 132 are coupled to SCA 120 through a converter (not shown) that includes, e.g., and without limitation, a direct current-to-alternating current (DC/AC) inverter coupled to a high frequency DC/DC step up converter through a high voltage DC link. Such converters have ratings that include, without limitation, a range of power outputs between 0.1 kilowatt (kW) and 100.0 kW, a range of voltage outputs between 500 volts (rms) and 3000 volts (rms), a range of DC link voltages between 0.8 kilovolts (kV) and 5.0 kV, and an output frequency in a range between 0 Hertz (Hz) and 1000 Hz.

Alternative embodiments of robotic devices include, without limitation, assembly line robots. Such assembly line robots typically include a single robotic arm that includes a device, such as SCA 120 receiving AC power from an alternating current (AC) source through a power converter system that includes an AC/DC boost rectifier coupled to the AC power source, a DC/AC inverter coupled to SCA 120, and a high voltage DC link coupled to the rectifier and the inverter. Such converters have ratings that include, without limitation, a range of power outputs between 0.1 kW and 100.0 kW, a range of voltage outputs between 500 volts (rms) and 3000 volts (rms), a range of DC link voltages between 0.8 kV and 5.0 kV, and an output frequency in a range between 0 Hz and 1000 Hz.

Figure 2:
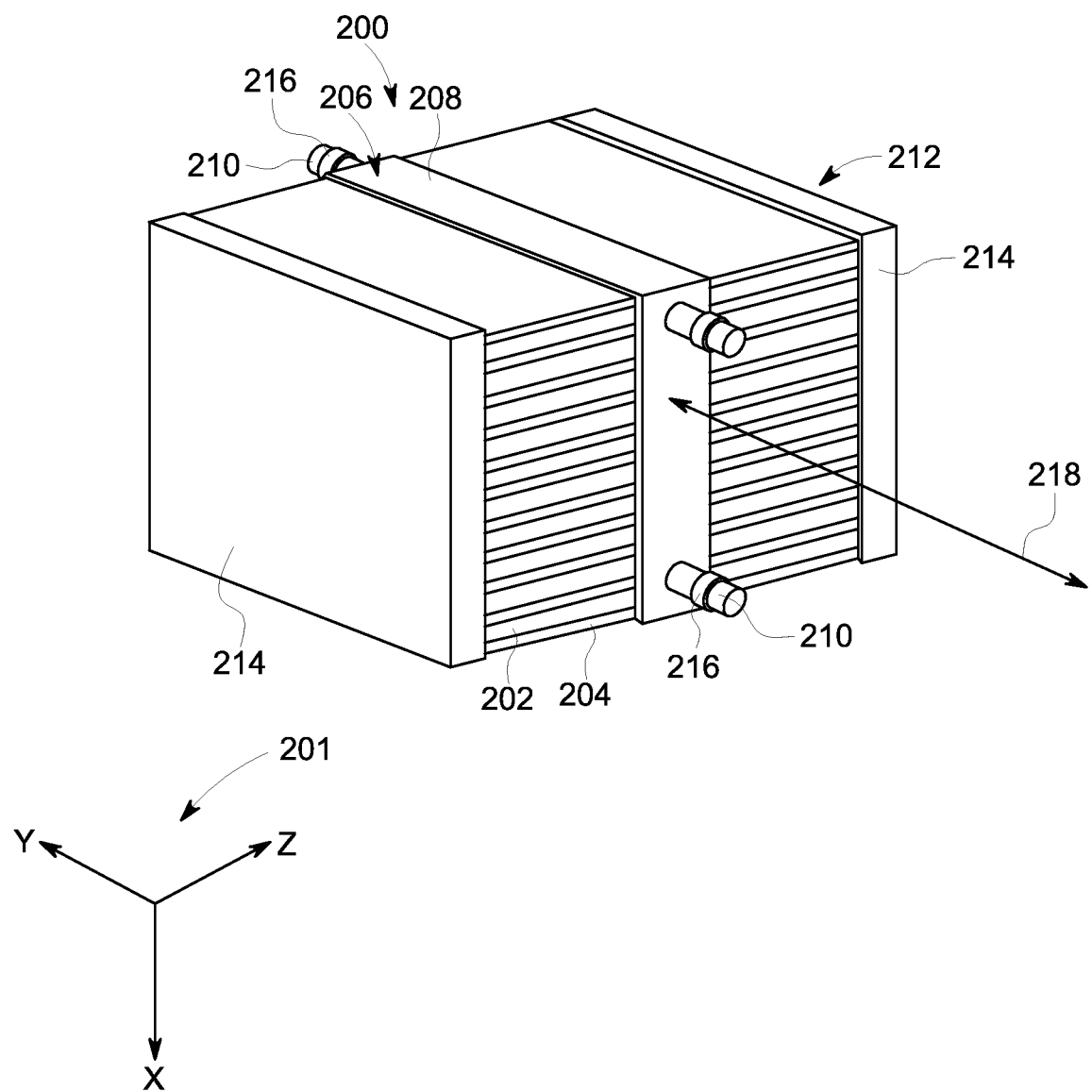
FIG. 2 is a schematic perspective view of an exemplary linear SCA that may be used with the robotic device shown in FIG. 1.

FIG. 2 is a schematic perspective view of an exemplary linear SCA 200 that may be used with robotic device 100 as an exemplary embodiment of SCA 120 (both shown in FIG. 1). A coordinate system 201 includes an x-axis (height direction), a y-axis (longitudinal dimension), and a z-axis (width, or transverse direction) for reference. In the exemplary embodiment, linear SCA 200 includes a translatable assembly 206 that includes a translatable center piece 208 and twenty (20) translatable circuit boards 202. Translatable center piece 208 includes four shafts 210 (only three shown). Translatable circuit boards 202 are manufactured with a precise predetermined thickness and dovetailed into center piece 208 with precise slots (not shown) defined therein. Linear SCA 200 also includes a stationary assembly 212 that includes two side plates 214, twenty-two (22) stator circuit boards 204, and four bearings 216 (only three shown). Stationary circuit boards 204 are manufactured with a precise predetermined thickness and dovetailed into side plates 214 with precise slots (not shown) defined therein. Stationary circuit boards 204 and translatable circuit boards 202 are substantially parallel to each other. Translatable assembly 206 is linearly translatable with respect to stationary assembly 212 with movement of translatable assembly 206 induced in opposing directions parallel to the longitudinal y-axis as indicated by direction of translation arrow 218.

Translatable center piece 208 and side plates 214 are fabricated from electrically insulated structural materials to hold circuit boards 204 and 202, respectively, such that a gap (not shown in FIG. 2) of predetermined dimensions is defined. Such electrically insulated structural materials include any combination of, without limitation, thermosets and thermoplastics. Thermosets include epoxies either unfilled or filled with fillers and fiberglass to improve mechanical and electrical properties. Thermoplastics include selections from a plurality of engineering plastics, e.g., without limitation, polypropylene, polyetherimide, and polycarbonates that may be either filled or unfilled with fillers and fiberglass to improve mechanical and electrical properties.

Linear SCA 200 is configured to induce a shear force in the longitudinal direction in a range between approximately 260 Newtons (N) and approximately 1200 N with a continuous power draw at a translation rate of translatable assembly 206 of approximately 1.25 meters per second (m/s) in a range between approximately 375 Watts (W) and approximately 2500 W. The weight of linear SCA 200 is in a range between approximately 800 grams (g) and approximately 1220 g to provide a gravimetric power density in a range between approximately 375 Watts per kilogram (W/kg) and approximately 2500 W/kg and a gravimetric force density in a range between approximately 300 Newtons per kilogram (N/kg) and approximately 2000 N/kg.

Figure 3:
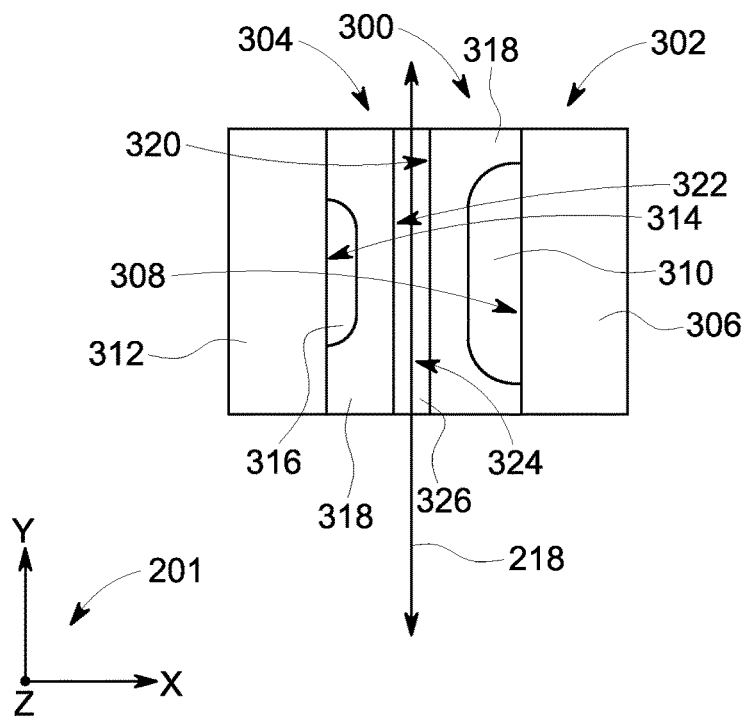
FIG. 3 is a schematic side view of an exemplary electrode configuration that may be used with the SCA shown in FIG. 2.

FIG. 3 is a schematic side view of an exemplary electrode configuration 300 that may be used with SCA 200 (shown in FIG. 2). Coordinate system 201, including the x-axis (height direction), the y-axis (longitudinal dimension), and the z-axis (transverse direction), is provided for reference. Electrode configuration 300 includes a stationary portion 302 and a translatable portion 304 positioned proximate to each other. Translatable portion 304 is complementary with and in opposition to stationary portion 302. Stationary portion 302 includes a stationary substrate 306 that includes a stationary substrate surface 308. Stationary portion 302 also includes a plurality of stationary electrodes 310 (only one shown in FIG. 3) coupled to stationary surface 308 through any method that enables operation of linear SCA 200 as described herein, including, without limitation, adhesives, soldering, and brazing, where the adhesive, soldering, and brazing materials (not shown) are structurally, chemically, and electrically compatible with stationary electrodes 310 and stationary substrate 306. In the exemplary embodiment, stationary substrate 306 is manufactured from any material that enables operation of linear SCA 200 as described herein, including, without limitation, an epoxy composite with a predetermined permittivity, such as, without limitation, FR-4 and alumina ceramics to facilitate structural support of stationary electrodes 310. Further, stationary electrodes 310 are formed from any materials that enable operation of linear SCA 200 as described herein.

Similarly, translatable portion 304 includes a translatable substrate 312 that includes a translatable substrate surface 314. Translatable portion 304 also includes a plurality of translatable electrodes 316 (only one shown in FIG. 3) coupled to stationary surface 314 through any method that enables operation of linear SCA 200 as described herein, including, without limitation, adhesives, soldering, and brazing, where the adhesive, soldering, and brazing materials (not shown) are structurally, chemically, and electrically compatible with translatable electrodes 316 and translatable substrate 312. In the exemplary embodiment, translatable substrate 312 is manufactured from any material that enables operation of linear SCA 200 as described herein, including, without limitation, an epoxy composite with a predetermined permittivity, such as, without limitation, FR-4 and alumina ceramics to facilitate structural support of translatable electrodes 316. Further, translatable electrodes 316 are formed from any materials that enable operation of linear SCA 200 as described herein.

Also, in the exemplary embodiment, stationary electrodes 310 and translatable electrodes 316 include an at least partially rectangular perimeter (not shown) in the Y-Z plane at least partially defined by direction of translation 218. Alternatively, stationary electrodes 310 and translatable electrodes 316 include any shape that enables operation of electrode configuration 300 and SCA 200 as described herein, including, without limitation, an at least partially circular or oval perimeter in the Y-Z plane at least partially defined by direction of translation 218.

Further, in the exemplary embodiment, electrode configuration 300 includes at least one layer of dielectric coatings 318 formed on each of stationary surface 308 and translatable surface 314. Alternatively, in some embodiments, SCA 200 includes at least one layer of dielectric coatings 318 on only one of stationary surface 308 and translatable surface 314. Dielectric coatings 318 are formed from high permittivity materials, including, without limitation, semicrystalline terpolymer P(VDF-TrFE-CFE), where VDF is vinylidene fluoride, TrFe is trifluoroethylene, and CFE is 1,1-chlorofluoroethylene, and barium titanate ($BaTiO_3$) doped polymers. Dielectric coating 318 formed on stationary surface 308, in some embodiments, is a different material from that coating 318 formed on translatable surface 314. Moreover, in some embodiments, dielectric coatings 318 are formed from a plurality of layers, where one or more layers are the same material or one of more layers are a different material. Further, stationary electrodes 310 and translatable electrodes 316 are fully embedded within dielectric coatings 318. Alternatively, stationary electrodes 310 and translatable electrodes 316 are partially embedded within dielectric coatings 318 such that a portion of stationary electrodes 310 and translatable electrodes 316 are exposed. Dielectric coatings 318 facilitate improving performance of SCA 200 by increasing corona and surface flashover voltage, and reducing a potential for any ferroelectric effects.

Moreover, in the exemplary embodiment, a stationary dielectric coating surface 320 and a translatable dielectric coating surface 322 define a gap 324 filled with a dielectric fluid 326 that is any fluid with any permittivity value that enables operation of SCA 200 as described herein, including, without limitation, ultrapure water or $SF_6$ at predetermined pressures. Alternatively, in some embodiments, SCA 200 includes only one of stationary dielectric coating surface 320 and translatable dielectric coating surface 322.

Figure 4:
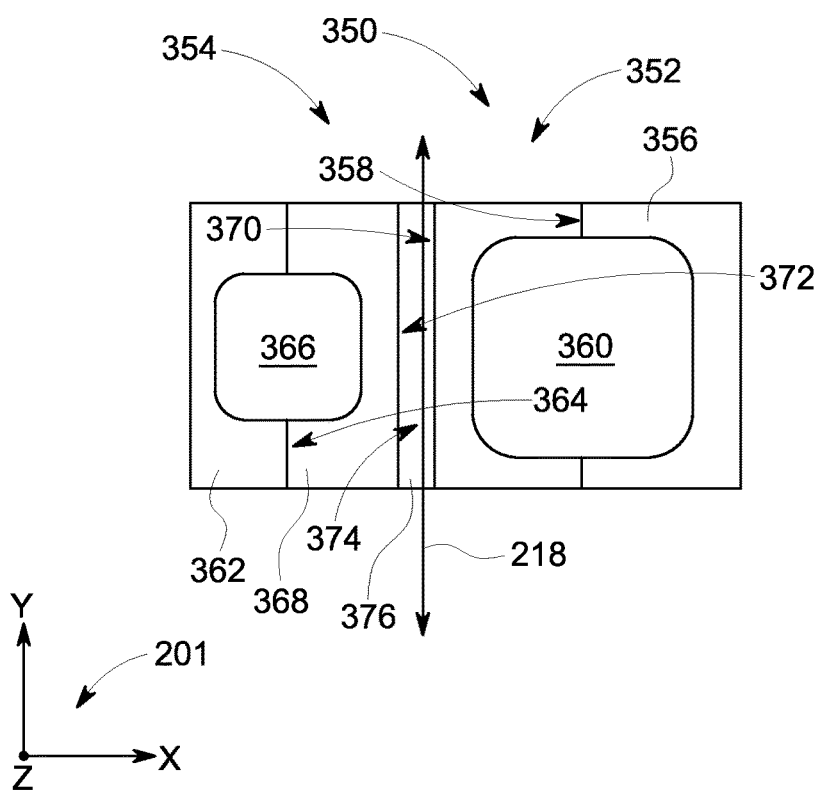
FIG. 4 is a schematic side view of an alternative electrode configuration that may be used with the SCA shown in FIG. 2.

FIG. 4 is a schematic side view of an alternative electrode configuration 350 that may be used with SCA 200 (shown in FIG. 2). Coordinate system 201, including the x-axis (height direction), the y-axis (longitudinal dimension), and the z-axis (transverse direction), is provided for reference. Electrode configuration 350 includes a stationary portion 352 and a translatable portion 354 positioned proximate stationary portion 352. Stationary portion 352 includes a stationary substrate 356 that includes a stationary substrate surface 358. Stationary portion 352 also includes a plurality of stationary electrodes 360 (only one shown in FIG. 4) embedded within stationary substrate 356 through any method that enables operation of linear SCA 200 as described herein, including, without limitation, forming one of more layers of substrate 356 around electrodes 360. In the exemplary embodiment, stationary substrate 356 is manufactured from any material that enables operation of linear SCA 200 as described herein, including, without limitation, an epoxy composite with a predetermined permittivity, such as, without limitation, FR-4 and alumina ceramics to facilitate structural support of stationary electrodes 360. Further, stationary electrodes 360 are formed from any materials that enable operation of linear SCA 200 as described herein.

Similarly, translatable portion 354 includes a translatable substrate 362 that includes a translatable substrate surface 364. Translatable portion 354 also includes a plurality of translatable electrodes 366 (only one shown in FIG. 4) embedded within translatable substrate 362 through any method that enables operation of linear SCA 200 as described herein, including, without limitation, forming one of more layers of substrate 362 around electrodes 366. In the exemplary embodiment, translatable substrate 362 is manufactured from any material that enables operation of linear SCA 200 as described herein, including, without limitation, an epoxy composite with a predetermined permittivity, such as, without limitation, FR-4 to facilitate structural support of translatable electrodes 366. Further, translatable electrodes 366 are formed from any materials that enable operation of linear SCA 200 as described herein.

Also, in the exemplary embodiment, stationary electrodes 360 and translatable electrodes 366 include an at least partially rectangular perimeter (not shown) in the Y-Z plane at least partially defined by direction of translation 218. Alternatively, stationary electrodes 360 and translatable electrodes 366 include any shape that enables operation of electrode configuration 350 and SCA 200 as described herein, including, without limitation, an at least partially circular or oval perimeter in the Y-Z plane at least partially defined by direction of translation 218.

Further, in the exemplary embodiment, electrode configuration 350 includes at least one layer of dielectric coatings 368 formed on each of stationary surface 358 and translatable surface 364. Alternatively, in some embodiments, SCA 200 includes at least one layer of dielectric coatings 368 on only one of stationary surface 368 and translatable surface 364. Dielectric coatings 368 are formed from high permittivity materials, including, without limitation, P(VDF-TrFE-CFE and barium titanate ($BaTiO_3$) doped polymers. Dielectric coating 368 formed on stationary surface 358, in some embodiments, is a different material from that coating 368 formed on translatable surface 364. Moreover, in some embodiments, dielectric coatings 368 are formed from a plurality of layers, where one or more layers are the same material or one of more layers are a different material. Further, stationary electrodes 360 and translatable electrodes 366 are fully embedded within dielectric coatings 368. Alternatively, stationary electrodes 360 and translatable electrodes 366 are partially embedded within dielectric coatings 368 such that a portion of stationary electrodes 360 and translatable electrodes 366 are exposed. Dielectric coatings 368 facilitate improving performance of SCA 200 by increasing corona and surface flashover voltage, and reducing a potential for any ferroelectric effects.

Moreover, in the exemplary embodiment, a stationary dielectric coating surface 370 and a translatable dielectric coating surface 372 define a gap 374 filled with a dielectric fluid 376 that is any fluid with any permittivity value that enables operation of SCA 200 as described herein, including, without limitation, ultrapure water and $SF_6$ at predetermined pressures. Alternatively, in some embodiments, SCA 200 includes only one of stationary dielectric coating surface 370 and translatable dielectric coating surface 372.

Figure 5:
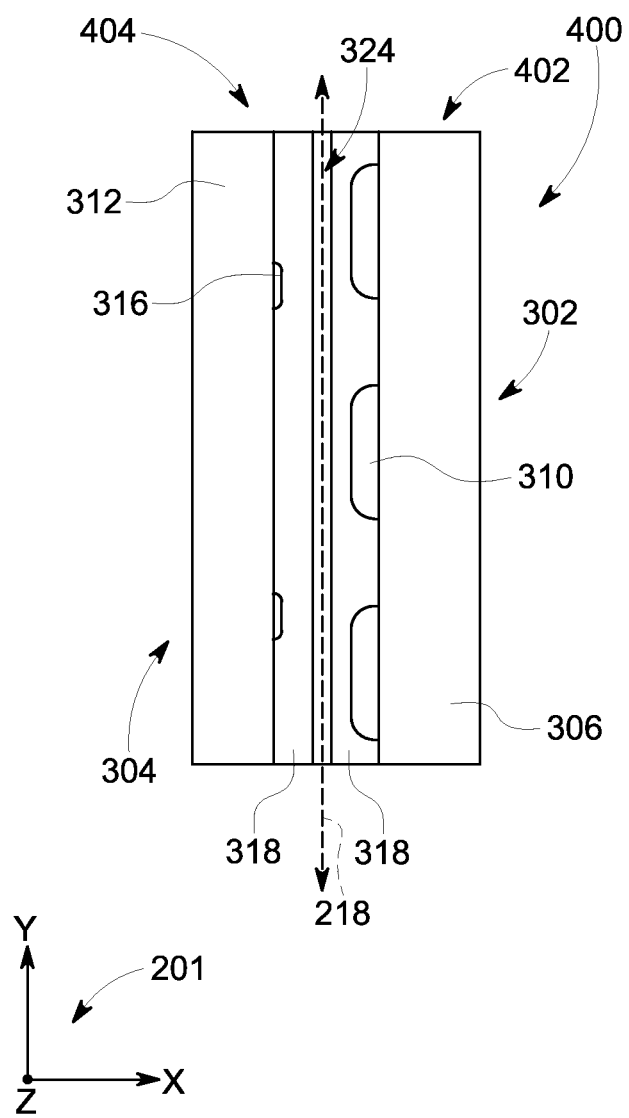
FIG. 5 is a schematic side view of an exemplary unit cell that may be used with the SCA shown in FIG. 2.

FIG. 5 is a schematic side view of an exemplary unit cell 400 that may be used with SCA 200 (shown in FIG. 2). Coordinate system 201, including the x-axis (height direction), the y-axis (longitudinal dimension), and the z-axis (transverse direction), is provided for reference. Unit cell 400 is the smallest repeating portion of SCA 200 and unit cell 400 includes the general configuration as shown in electrode configuration 300 (shown in FIG. 3). In the exemplary embodiment, each unit cell 400 includes a stationary section 402 and a translatable section 404 and SCA 200 includes a plurality of unit cells 400 coupled together to form a continuous stationary portion 302 and a continuous translatable portion 304. Also, unit cell 400 includes a first number representative of stationary electrodes 310 and a second number representative of translatable electrodes 316, where the first number is greater than the second number. In the exemplary embodiment, unit cell 400 includes three stationary electrodes 310 and two translatable electrodes 316. Alternatively, unit cell 400 includes any number of stationary electrodes 310 and any number of translatable electrodes 316, including, without limitation, the same number of translatable electrodes 316 as stationary electrodes 310 and a greater number of translatable electrodes 316 as stationary electrodes 310.

Also, in the exemplary embodiment, stationary electrodes 310 and translatable electrodes 316 include an at least partially rectangular perimeter (not shown) in the Y-Z plane at least partially defined by direction of translation 218. Alternatively, stationary electrodes 310 and translatable electrodes 316 include any shape that enables operation of unit cell 400 and SCA 200 as described herein, including, without limitation, an at least partially circular or oval perimeter in the Y-Z plane at least partially defined by direction of translation 218.

Figure 6:
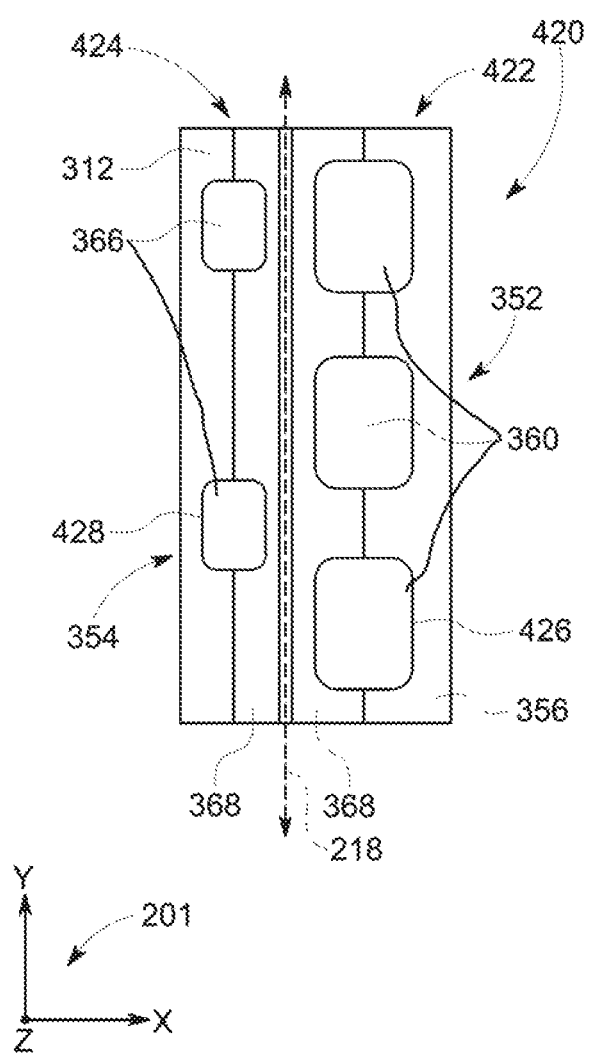
FIG. 6 is a schematic side view of an alternative unit cell that may be used with the SCA shown in FIG. 2.

FIG. 6 is a schematic side view of an alternative unit cell 420 that may be used with linear SCA 200 shown in (FIG. 2). Coordinate system 201, including the x-axis (height direction), the y-axis (longitudinal dimension), and the z-axis (transverse direction), is provided for reference. Unit cell 420 includes the general configuration as shown in electrode configuration 350 (shown in FIG. 4). In the exemplary embodiment, each unit cell 420 includes a stationary section 422 and a translatable section 424 and SCA 200 includes a plurality of unit cells 420 coupled together to form a continuous stationary portion 422 and a continuous translatable portion 424. Also, unit cell 420 includes a first number representative of stationary electrodes 360 and a second number representative of translatable electrodes 366, where the first number is greater than the second number. In the exemplary embodiment, unit cell 420 includes three stationary electrodes 360 and two translatable electrodes 366. Alternatively, unit cell 420 includes any number of stationary electrodes 360 and any number of translatable electrodes 366, including, without limitation, the same number of translatable electrodes 366 as stationary electrodes 360 and a greater number of translatable electrodes 366 as stationary electrodes 360.

Also, in this alternative embodiment, stationary electrodes 360 and translatable electrodes 366 include an at least partially rectangular perimeter 426 and 428, respectively, in the X-Y plane at least partially defined by direction of translation 218. Alternatively, stationary electrodes 360 and translatable electrodes 366 include an at least partially circular or oval perimeter in the X-Y plane at least partially defined by direction of translation 218.

Further, in the exemplary embodiment, stationary electrodes 360 and translatable electrodes 366 include an at least partially rectangular perimeter (not shown) in the Y-Z plane at least partially defined by direction of translation 218. Alternatively, stationary electrodes 360 and translatable electrodes 366 include any shape that enables operation of unit cell 420 and SCA 200 as described herein, including, without limitation, an at least partially circular or oval perimeter in the Y-Z plane at least partially defined by direction of translation 218.

Figure 7:
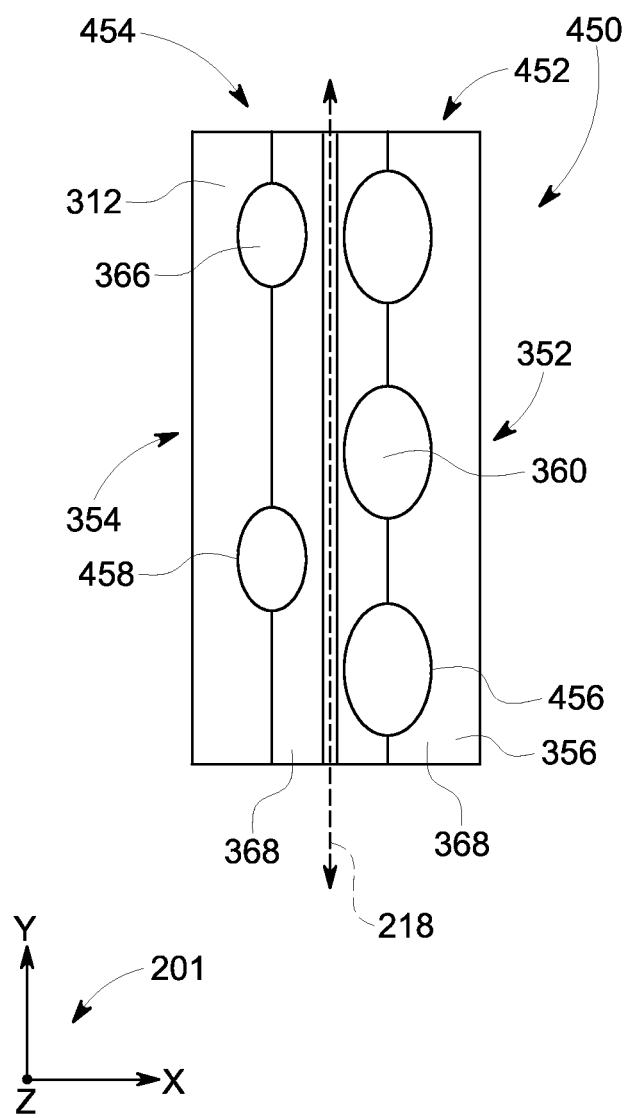
FIG. 7 is a schematic side view of another alternative unit cell that may be used with the SCA shown in FIG. 2.

FIG. 7 is a schematic side view of another alternative unit cell 450 that may be used with linear SCA 200 shown in (FIG. 2). Coordinate system 201, including the x-axis (height direction), the y-axis (longitudinal dimension), and the z-axis (transverse direction), is provided for reference. Unit cell 450 includes the general configuration as shown in electrode configuration 350 (shown in FIG. 4). In the exemplary embodiment, each unit cell 450 includes a stationary section 452 and a translatable section 454 and SCA 200 includes a plurality of unit cells 450 coupled together to form a continuous stationary portion 352 and a continuous translatable portion 354. Also, unit cell 450 includes a first number representative of stationary electrodes 360 and a second number representative of translatable electrodes 366, where the first number is greater than the second number. In the exemplary embodiment, unit cell 450 includes three stationary electrodes 360 and two translatable electrodes 366. Alternatively, unit cell 450 includes any number of stationary electrodes 360 and any number of translatable electrodes 366, including, without limitation, the same number of translatable electrodes 366 as stationary electrodes 360 and a greater number of translatable electrodes 366 as stationary electrodes 360.

Also, in this alternative embodiment, stationary electrodes 360 and translatable electrodes 366 include an oval perimeter 456 and 458, respectively, in the X-Y plane at least partially defined by direction of translation 218. Alternatively, stationary electrodes 360 and translatable electrodes 366 include an at least partially circular or rectangular perimeter in the X-Y plane at least partially defined by direction of translation 218.

Further, in this alternative embodiment, stationary electrodes 360 and translatable electrodes 366 include an at least partially convex perimeter (not shown) extending along the z-axis with a predetermined length in the Y-Z plane at least partially defined by direction of translation 218. Alternatively, stationary electrodes 360 and translatable electrodes 366 include any shape that enables operation of unit cell 420 and SCA 200 as described herein.

Figure 8:
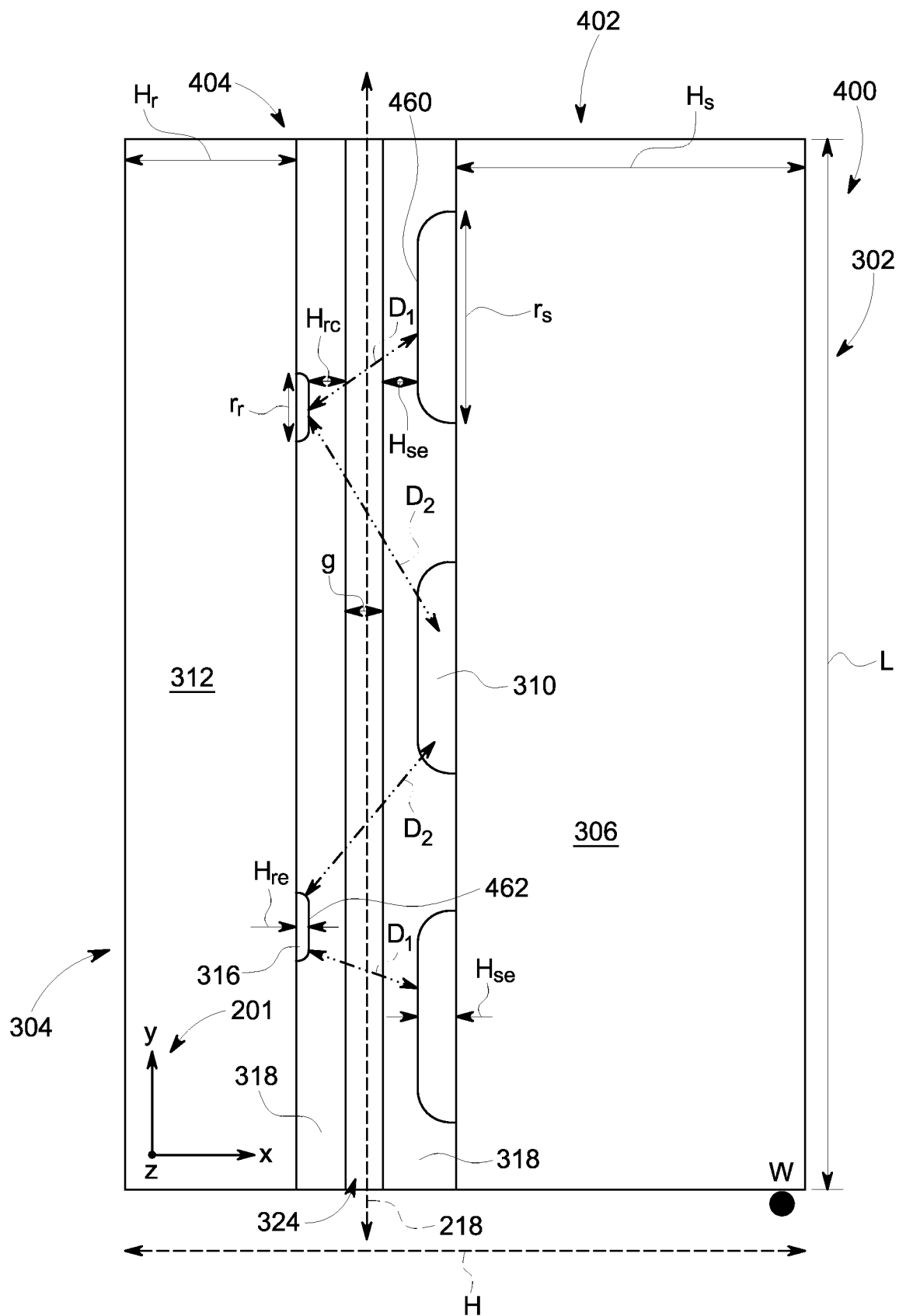
FIG. 8 is an enlarged schematic view of the unit cell shown in FIG. 5.

FIG. 8 is an enlarged schematic view of unit cell 400. Coordinate system 201, including the x-axis (height direction), the y-axis (longitudinal dimension), and the z-axis (transverse direction), is provided for reference. In the exemplary embodiment, unit cell 400 has a longitudinal length L extending in the longitudinal direction, a height H extending in the height direction, and a width W extending in the transverse direction. Unit cell 400 has any dimensions that enable operation of unit cell 400 and SCA 200 as described herein, and as such, unit cell 400 and SCA 200 are fully scalable.

Also, in the exemplary embodiment, stationary electrodes 310 and translatable electrodes 316 have an at least partially rectangular configuration (not shown) in the Y-Z plane at least partially defined by direction of translation 218. Alternatively, stationary electrodes 310 and translatable electrodes 316 include any shape that enables operation of unit cell 400 and SCA 200 as described herein, including, without limitation, an at least partially circular or oval perimeter in the Y-Z plane at least partially defined by direction of translation 218.

Therefore, in the exemplary embodiment, stationary electrode 310 includes a longitudinal dimension $r_s$ within a range between approximately 480 μm (480*10$^{-6}$ m) and approximately 800 μm (800*10$^{-6}$ m). Similarly, translatable electrode 316 includes a longitudinal dimension $r_r$ within a range between approximately 120 μm (120*10$^{-6}$ m) and approximately 300 μm (300*10$^{-6}$ m). Further, stationary electrode 310 includes a height dimension $H_{se}$ within a range between approximately 30 μm (30*10$^{-6}$ m) and approximately 50 μm (50*10$^{-6}$ m). Similarly, translatable electrode 316 includes a height dimension $H_{re}$ within a range between approximately 15 μm (15*10$^{-6}$ m) and approximately 37.5 μm (37.5*10$^{-6}$ m). Similarly, translatable electrode 316 includes a height dimension $H_{re}$ within a range between approximately 15 μm (15*10$^{-6}$ m) and approximately 37.5 μm (37.5*10$^{-6}$ m). As such, the total area presented in the X-Y plane for the three stationary electrodes 310 is $r_s*H_{se}*3$, i.e., within a range between approximately 43,200 μm$^2$ (4.32*10$^{-8}$ m$^2$) and approximately 120,000 μm$^2$ (1.2*10$^{-7}$ m$^2$). Since stationary electrodes 310 are rounded on the edges, the actual numbers for the areas of stationary electrodes 310 are within a range between approximately 40,300 μm$^2$ (4.03*10$^{-8}$ m$^2$) and approximately 112,000 μm$^2$ (1.12*10$^{-7}$ m$^2$). Alternatively, stationary electrodes 310 have any dimensions that enable operation of unit cell 400 and SCA 200 as described herein.

Similarly, the total area presented in the X-Y plane for the two translatable electrodes 316 is $r_r*H_{re}*2$, i.e., within a range between approximately 3,600 μm$^2$ (3.6*10$^{-9}$ m$^2$) and approximately 22,500 μm$^2$ (2.25*10$^{-8}$ m$^2$). Since translatable electrodes 316 are rounded on the edges, the actual numbers for the areas of translatable electrodes 316 are within a range between approximately 3.320 μm$^2$ (3.32*10$^{-9}$ m$^2$) and approximately 20,800 μm$^2$ (2.08*10$^{-8}$ m$^2$). Alternatively, translatable electrodes 316 have any dimensions that enable operation of unit cell 400 and SCA 200 as described herein.

Furthermore, in the exemplary embodiment, as described above, unit cell 400 has a width W extending in the transverse direction of approximately 76 μm (76*10$^{-6}$ m). As such, since stationary electrodes 310 area values are within a range between approximately 40,300 μm$^2$ (4.03*10$^{-8}$ m$^2$) and approximately 112,000 μm$^2$ (1.12*10$^{-7}$ m$^2$), the active electrode volume of stationary electrodes 310 is within a range between approximately 3.06*10$^6$ μm$^3$ (3.06*10$^{-12}$ m$^3$) and 8.51*10$^6$ μm$^3$ (8.51*10$^{-12}$ m$^3$). Similarly, since translatable electrodes 316 area values are within a range between approximately 3.320 μm$^2$ (3.32*10$^{-9}$ m$^2$) and approximately 20,800 μm$^2$ (2.08*10$^{-8}$ m$^2$), the active electrode volume of translatable electrodes 316 is within a range between approximately 2.52*10$^5$ μm$^3$ (2.52*10$^{-13}$ m$^3$) and 1.58*10$^6$ μm$^3$ (1.58*10$^{-12}$ m$^3$). Therefore, a ratio of the active electrode volumes of stationary electrodes 310 to the active electrode volumes of translatable electrodes 316 ranges between approximately 12.1 and approximately 5.39. As used herein, the terms "active electrode volume" and "substantially active electrode volume" refer to the volumes of unit cell 400 that actively and/or substantially contribute to the motion of translatable portion 304 in contrast to those portions of unit cell 400 that do not, or merely negligibly, contribute to the motion of translatable portion 304.

Moreover, in the exemplary embodiment, gap 324 has a gap width g in the height dimension. There is a distance $H_{sc}$ of dielectric coating 318 between a face 460 of stationary electrodes 310 and gap 324 and a distance $H_{rc}$ of dielectric coating 318 between a face 462 of translatable electrodes 316 and gap 324. Translatable substrate 312 has a height value $H_r$ and stationary substrate 306 has a height value $H_s$.

In addition, in the exemplary embodiment, gap 324 (and the dielectric liquid (not shown) therein) has a conductivity $\sigma_g$ and a permittivity $\varepsilon_g$. Dielectric coatings 318 have a conductivity $\sigma_c$ and a permittivity $\varepsilon_c$. The frequency of sequential voltage signals through stationary electrode 310 to generate the associated excitation fields is any value that enables operation of unit cell 400 and SCA 200 as described herein.

In operation, stationary electrodes 310 and translatable electrodes 316 correspond to the magnetic poles of an SRM. When an adjacent pair of stationary electrodes 310 is energized with voltage, an electrostatic field (not shown) is induced within gap 324. The electrostatic field includes a plurality of low density distribution regions (not shown) proximate those regions in gap 324 between adjacent stationary electrodes 310 and adjacent translatable electrodes 316 substantially parallel to direction of translation 218. The electrostatic field also includes a plurality of intermediate density distribution regions (not shown) proximate those regions in gap 324 having nonaligned stationary electrodes 310 and translatable electrodes 316. The electrostatic field further includes a plurality of high density distribution regions (not shown) proximate those regions in gap 324 having aligned stationary electrodes 310 and translatable electrodes 316. The strength of the electrostatic coupling, i.e., the density of the field distribution is proportional to the distance between stationary electrodes 310 and translatable electrodes 316. Therefore, the high density distribution regions and intermediate density distribution regions are proportional to distance $D_1$ and distance $D_2$, respectively. The high density distribution regions induce electric field distribution values within a range between approximately 10 kilovolts (kV) per millimeter (mm) and approximately 30 kV/mm.

Moreover, when an adjacent pair of stationary electrodes 310 is energized with voltage, a proximate translatable electrode 316 linearly translates to align with stationary electrodes 310. Once the adjacent pair of stationary electrodes 310 and proximate translatable electrodes 316 are aligned, the voltage on this pair of stationary electrodes 310 is removed and the appropriate next pair of stationary electrodes 310 that is not aligned with proximate translatable electrodes 316 is energized with the voltage to continue the linear motion as shown by arrow 218. In the exemplary embodiment, stationary electrodes 310 are energized to a value of approximately +3000 volts and translatable electrodes 316, which are grounded, have a voltage of substantially zero volts. Alternatively, any voltages are used that enable operation of SCA 200 as described herein.

To increase and more evenly distribute the force exerted on translatable section 404, multiple stationary electrodes 310 may be energized substantially simultaneously, e.g., without limitation, every other stationary electrode 310. To energize the stationary electrodes simultaneously, an external switching circuit (not shown) may be used to switch the excitation of stationary electrodes 310. Also, SCA 200 may also be energized through a synchronous three-phase power alternating current (AC) system.

Figure 9:
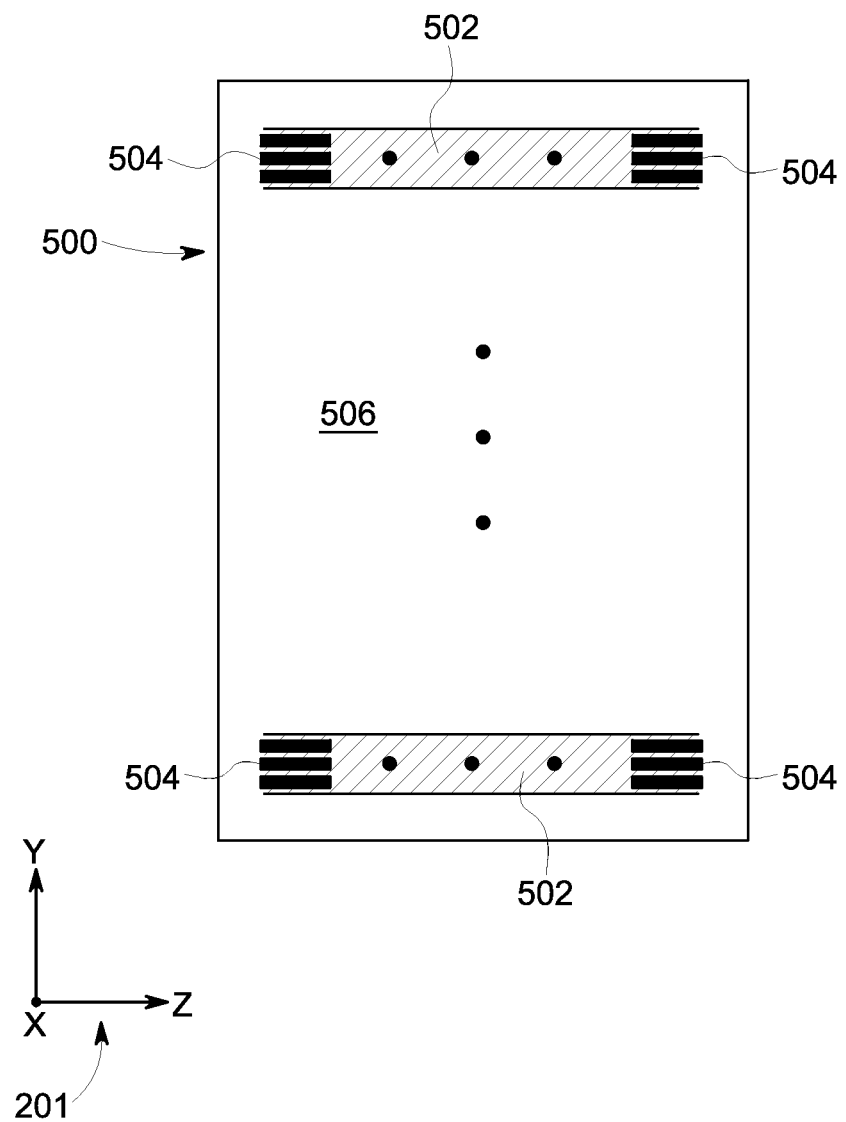
FIG. 9 is a schematic view of an exemplary electrode board that may be used with the SCA shown in FIG. 2.

FIG. 9 is a schematic view of an exemplary electrode board 500 that may be used with SCA 200 (shown in FIG. 2). Coordinate system 201, including the x-axis (height direction), the y-axis (longitudinal dimension), and the z-axis (transverse direction), is provided for reference. In the exemplary embodiment, electrode board 500 is a stationary electrode board. Alternatively, electrode board 500 is a translatable electrode board, where the general configuration of the stationary electrode boards and the translatable electrode boards is substantially similar. SCA 200 includes a plurality of electrode boards 500, where some of electrode boards 500 are stationary electrode boards and some are translatable electrode boards (as discussed further below). Electrode board 500 includes a plurality of unit cells 502 that are substantially similar to unit cell 400 (shown in FIGS. 5 and 8). Alternatively, unit cells 502 are substantially similar to unit cells 420 and 450 (shown in FIGS. 6 and 7, respectively). Also, alternatively, unit cells 502 have any configuration that enables operation of SCA 200 as described herein. Plurality of unit cells 502 forms either a continuous stationary portion 302 or continuous translatable portion 304 (both shown in FIGS. 3, 5, and 8).

In the exemplary embodiment, unit cells 502 include a plurality of rows of substantially rectangular stationary electrodes 504 extending along a substrate 506 in a direction substantially parallel to the transverse direction (Z) and substantially orthogonal to the longitudinal dimension (Y). Rows of substantially rectangular stationary electrodes 504 on both the stationary electrode boards and the translatable electrode boards extend along their respective substrates 506 complementary with each other in the Y-Z plane and in opposition to each other with respect to the height (X) dimension.

Figure 10:
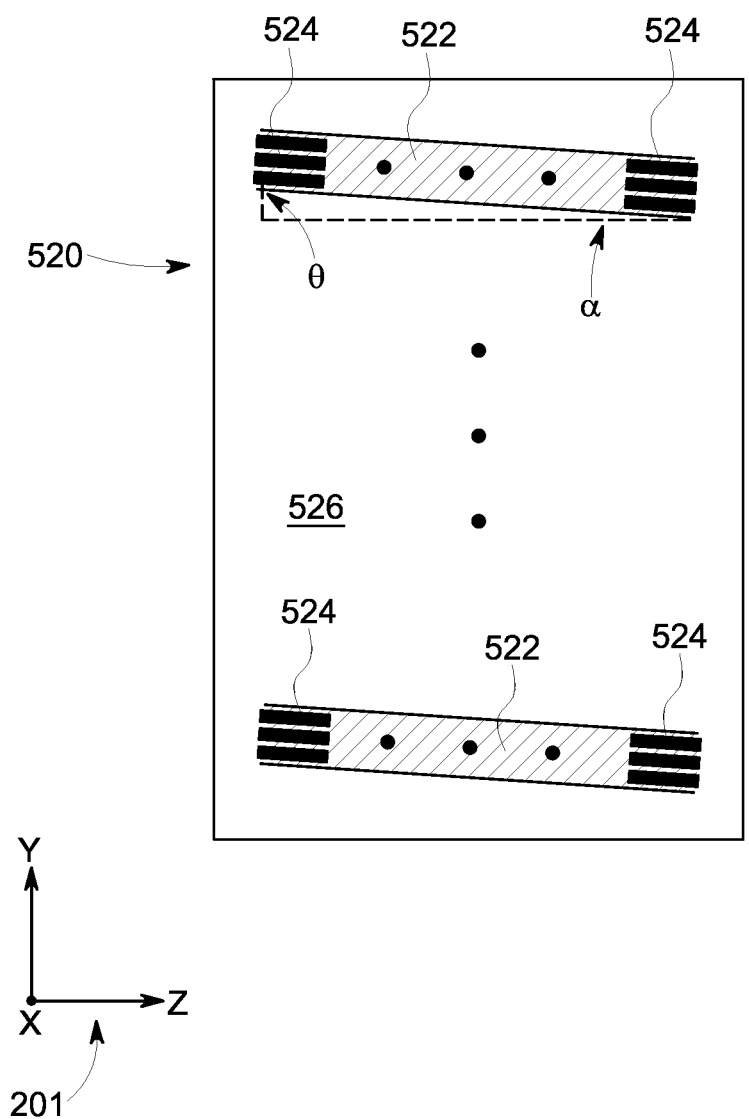
FIG. 10 is a schematic view of an alternative electrode board that may be used with the SCA shown in FIG. 2.

FIG. 10 is a schematic view of an alternative electrode board 520 that may be used with SCA 200 (shown in FIG. 2). Coordinate system 201, including the x-axis (height direction), the y-axis (longitudinal dimension), and the z-axis (transverse direction), is provided for reference. In the exemplary embodiment, electrode board 520 is a stationary electrode board. Alternatively, electrode board 520 is a translatable electrode board. SCA 200 includes a plurality of electrode boards 520, where some of electrode boards 520 are stationary electrode boards and some are translatable electrode boards (as discussed further below). Electrode board 520 includes a plurality of unit cells 522 that are substantially similar to unit cell 400 (shown in FIGS. 5 and 8). Alternatively, unit cells 522 are substantially similar to unit cells 420 and 450 (shown in FIGS. 6 and 7, respectively). Also, alternatively, unit cells 522 have any configuration that enables operation of SCA 200 as described herein. Plurality of unit cells 522 forms either continuous stationary portion 302 or continuous translatable portion 304 (both shown in FIGS. 3, 5, and 8).

In the exemplary embodiment, unit cells 522 include a plurality of rows of substantially rectangular stationary electrodes 524 extending along a substrate 526 at a skewed angle α in the Y-Z plane with respect to the transverse direction (Z) and a complementary skewed angle θ with respect to the longitudinal dimension (Y). In some embodiments, the general configuration of the stationary electrode boards and the translatable electrode boards is substantially similar. Specifically, rows of substantially rectangular stationary electrodes 524 on both the stationary electrode boards and the translatable electrode boards extend along their respective substrates 526 complementary with each other in the Y-Z plane and in opposition to each other with respect to the height (X) dimension. Alternatively, in some other embodiments, only one of the stationary electrode boards and the translatable electrode boards includes the skewed electrodes and the other board includes electrodes similar to those shown in FIG. 9.

Figure 11:
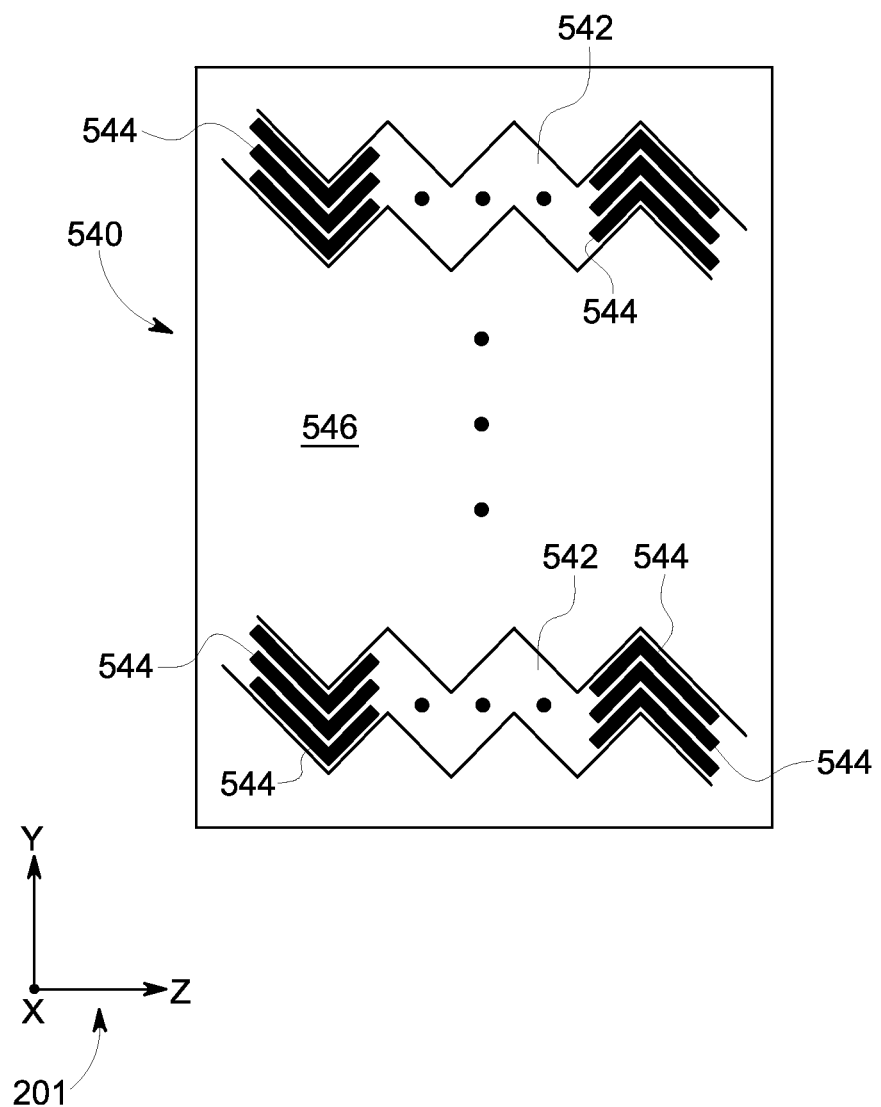
FIG. 11 is a schematic view of another exemplary electrode board that may be used with the SCA shown in FIG. 2.

FIG. 11 is a schematic view of another exemplary electrode board 540 that may be used with SCA 200 (shown in FIG. 2). Coordinate system 201, including the x-axis (height direction), the y-axis (longitudinal dimension), and the z-axis (transverse direction), is provided for reference. In the exemplary embodiment, electrode board 540 is a stationary electrode board. Alternatively, electrode board 540 is a translatable electrode board, where the general configuration of the stationary electrode boards and the translatable electrode boards is substantially similar. SCA 200 includes a plurality of electrode boards 540, where some of electrode boards 540 are stationary electrode boards and some are translatable electrode boards (as discussed further below). Electrode board 540 includes a plurality of unit cells 542 that are substantially similar to unit cell 400 (shown in FIGS. 5 and 8). Alternatively, unit cells 542 are substantially similar to unit cells 420 and 450 (shown in FIGS. 6 and 7, respectively). Also, alternatively, unit cells 542 have any configuration that enables operation of SCA 200 as described herein. Plurality of unit cells 542 forms either continuous stationary portion 302 or continuous translatable portion 304 (both shown in FIGS. 3, 5, and 8).

In the exemplary embodiment, unit cells 542 include a plurality of substantially chevron-shaped stationary electrodes 544 extending along a substrate 546 with a substantially serrated (saw tooth) pattern in the Y-Z plane with respect to the transverse direction (Z) and with respect to the longitudinal dimension (Y). In some embodiments, the general configuration of the stationary electrode boards and the translatable electrode boards is substantially similar. Specifically, substantially chevron-shaped stationary electrodes 544 on both the stationary electrode boards and the translatable electrode boards extend along their respective substrates 546 complementary with each other in the Y-Z plane and in opposition to each other with respect to the height (X) dimension. Alternatively, in some other embodiments, only one of the stationary electrode boards and the translatable electrode boards includes the saw-toothed electrodes and the other board includes electrodes similar to those shown in FIG. 9.

Figure 12:
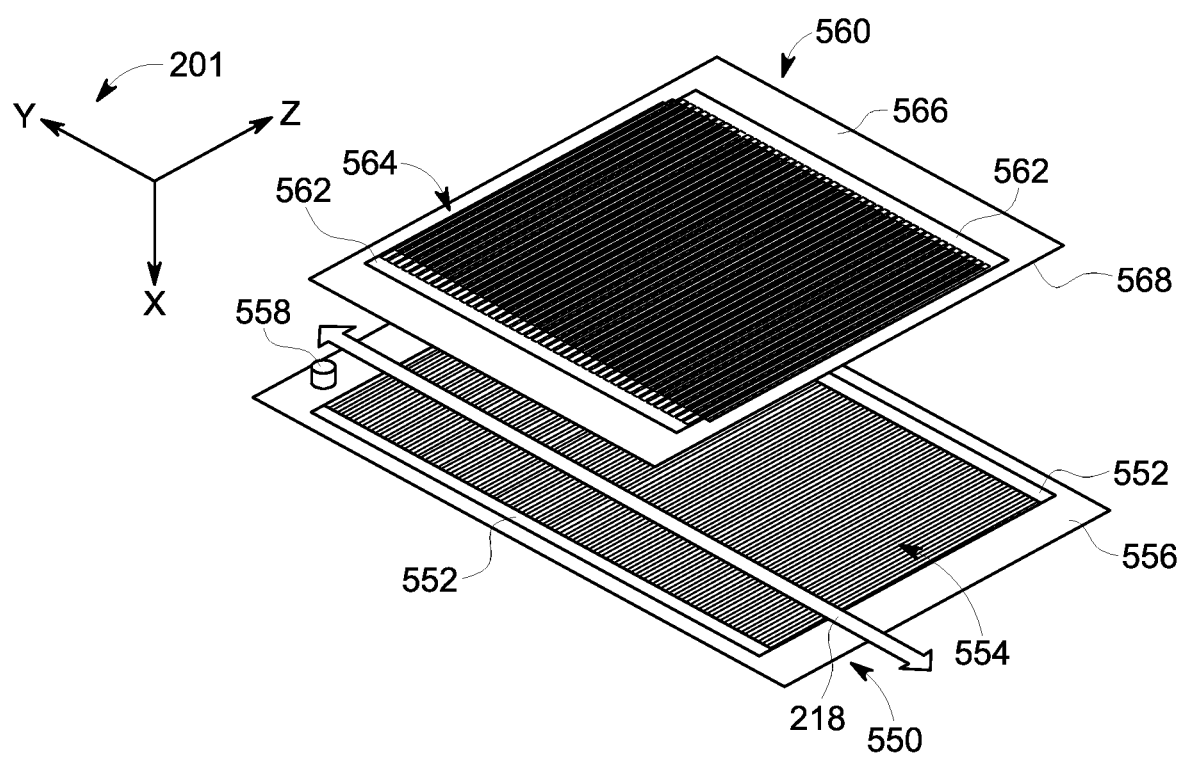
FIG. 12 is a schematic view of an exemplary configuration of a stationary board and a translatable board that may be used with the SCA shown in FIG. 2.
Figure 13:
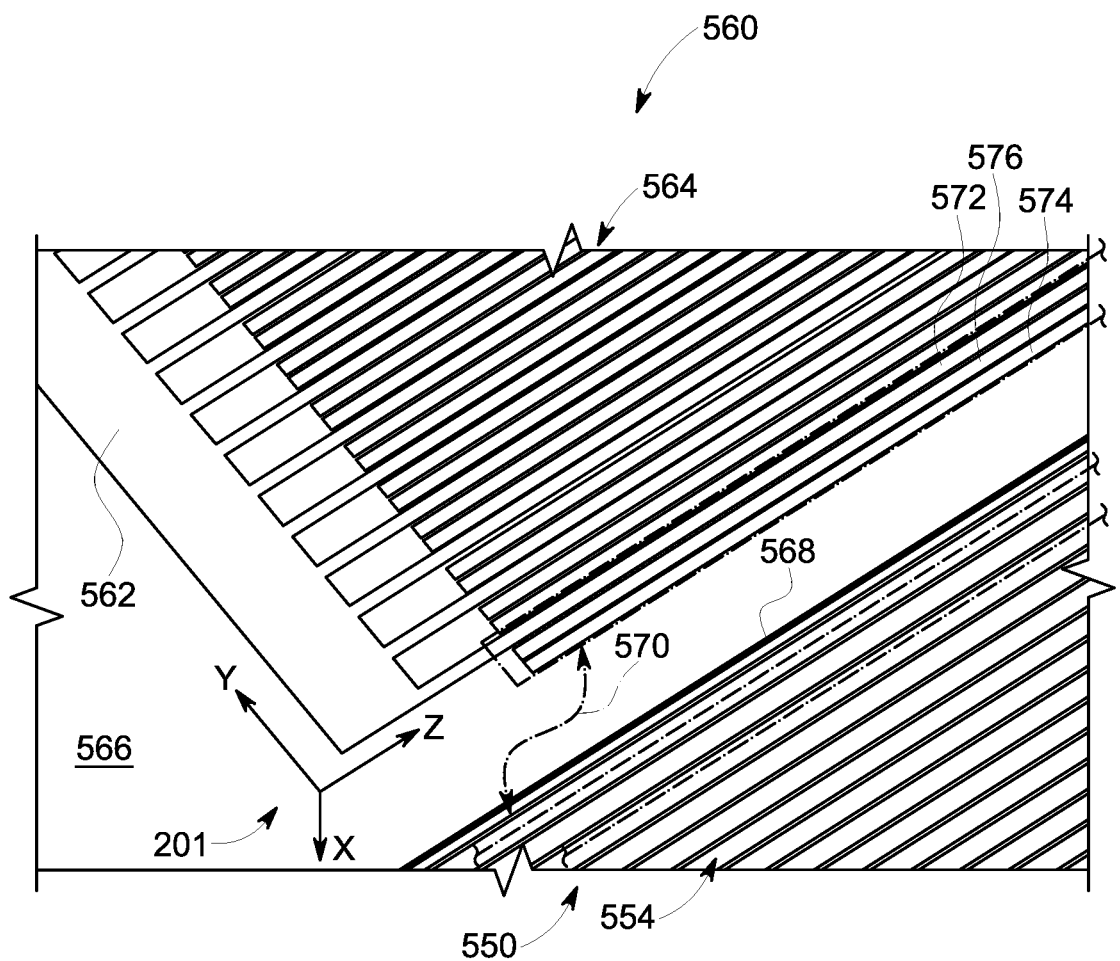
FIG. 13 is an enlarged schematic view of a portion of the configuration of the stationary board and the translatable board shown in FIG. 12.

FIG. 12 is a schematic view of an exemplary configuration of a stationary electrode board 560 and a translatable board 550 that may be used with SCA 200 (shown in FIG. 2). FIG. 13 is an enlarged schematic view of a portion of the configuration of 560 stationary board and translatable board 500 from FIG. 12. Coordinate system 201, including the x-axis (height direction), the y-axis (longitudinal dimension), and the z-axis (transverse direction), is provided for reference. Stationary electrode board 560 is substantially equivalent to stationary circuit boards 204 (shown in FIG. 2) and translatable electrode board 550 is substantially equivalent to translatable circuit boards 202 (shown in FIG. 2). In the exemplary embodiment, translatable electrode board 550 includes a plurality of translatable electrodes 554 on a substrate 556 in a configuration similar to that shown in FIG. 9. Translatable electrode board 550 also includes a plurality of electrical connection side strips 552 positioned on substrate 556 and coupled to translatable electrodes 554 to facilitate uniformity of grounding of board 550. Also, translatable electrode board 550 includes a plurality of mechanical support members 558 (only one shown) configured to couple translatable electrode board 550 to a load (not shown).

Similarly, stationary electrode board 560 includes a plurality of stationary electrodes 564 on a substrate 566 in a configuration similar to that shown in FIG. 9. Stationary electrode board 560 also includes a plurality of electrical connection side strips 562 positioned on substrate 566 and coupled to stationary electrodes 564 to facilitate uniformity of voltage excitation to board 560. Stationary electrode board 560 further includes a board edge 568. Translatable electrodes 554 and stationary electrodes 564 are complementary with, and in opposition to, each other.

Further, in the exemplary embodiment, as stationary electrodes 564 are energized in a predetermined sequence. The energized stationary electrodes 564 have a stationary active electrode volume. The charged translatable electrodes 554 have a translatable active electrode volume that is less than the stationary active electrode volume. Translatable electrode board 550 moves linearly in the longitudinal dimension as shown by translation arrow 218 that is orthogonal to stationary electrodes 564 and translatable electrodes 554. The voltages transmitted through stationary electrodes 564 include a plurality of sequential voltage signals through stationary electrode board 560 such that a cyclic linear motion 218 of translatable electrode board 550 in the longitudinal direction is facilitated Referring to FIG. 13, stationary electrode board 560 and translatable electrode board 550 define a plurality of unit cells 570 (only one shown in FIG. 13) sequentially arranged. Each unit cell 570 includes three stationary electrodes 564 and two translatable electrodes 554 (shown offset from stationary electrodes 564 for purposes of illustration and clarity). As such, unit cell 570 is similar to unit cell 400 (shown in FIGS. 6 and 8).

In the exemplary embodiment, both stationary electrode boards 560 and translatable electrode boards 550 are two-sided, i.e., both sides of each board 560 and 550 have the same stationary electrodes 564 and the same translatable electrodes 554, respectively, thereon. A first row of stationary electrodes 572 of each unit cell 570 is coupled to one of two electrical connection side strips 562 and a second row of stationary electrodes 574 of each unit cell 570 is coupled to the other electrical connection side strip 562 on the opposite side of stationary electrode board 560 (as shown in FIG. 12). A third row of stationary electrodes 576 of each unit cell 570 is coupled to a single electrical connection side strip (not shown) on the opposite side (not shown) of stationary electrode board 560. Electrodes 572, 574, and 576 are connected from the top of board 560 (as shown facing upward in FIGS. 12 and 13) to the bottom of board 560 (not shown) by vias, i.e., small holes cut straight through substrate 566 and filled with copper, thereby facilitating the top and bottom sides of boards 560 to be connected. Unit cells 570 and associated electrodes 572, 574, and 576 define an active section of board 560, where electrodes 572 and 576 define a combed configuration on top of board 560. Electrodes 574 on the bottom of board 560 extend upward through substrate 566 through a via to sit between electrodes 572 and 576 on the top of board 560. Similarly, electrodes 572 and 576 extend downward through substrate 566 through associated vias to replicate the configuration shown on top of board 560. As such, the active sections of board 560 are substantially identical on the top and bottom of board 560. An inactive signal routing section of board 560 includes the two bus connections 562. In those embodiments including stationary electrodes 564 that are energized through a synchronous three-phase power alternating current (AC) system, each of stationary electrodes 572, 574, and 576 is coupled to one of an A-phase, a B-phase, and a C-phase.

Figure 14:
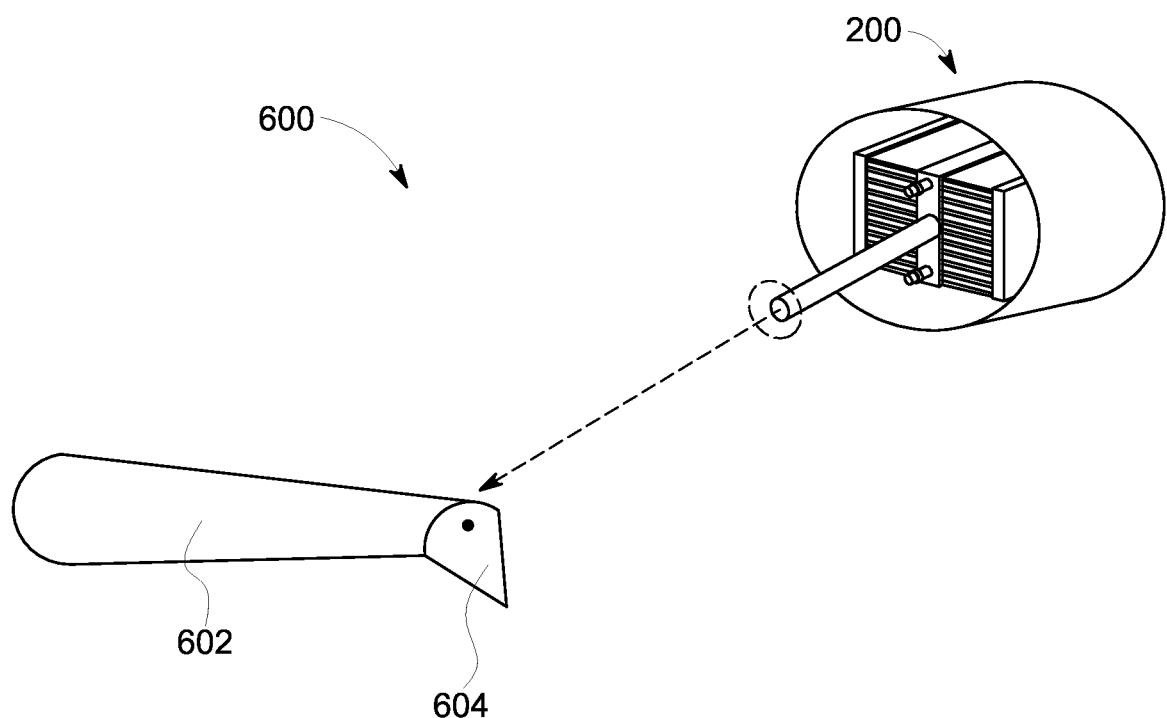
FIG. 14 is a schematic view of an exemplary aircraft component that may use the SCA shown in FIG. 2.

FIG. 14 is a schematic view of another exemplary machine, and more specifically, an aircraft component, i.e., aircraft wing 600 that may use SCA 200. Aircraft wing 600 includes an airfoil portion 602 and a flap portion 604 hingedly coupled to airfoil portion 602 through SCA 200. SCA 200 is energized as described above to hingedly position flap portion 604 through liner translation of SCA 200.

The above-described switched capacitive devices provide a cost-effective method for increasing the energy efficiency of the associated devices and systems. Specifically, in order to achieve higher total energy efficiency for the actuation systems embedded within those systems, a high power switched capacitance actuator (SCA) is used. More specifically, operation of the disclosed SCAs is based on a spatial change of electric fields rather than based on magnetic fields as in some conventional EMAs The SCAs described herein offer advantages over electromagnetic machines that include, without limitation, sufficient torque generation without using continuous current, removing the requirement of using an iron core as a magnetic conductor, eliminating the need for a yoke, and significantly decreasing the amount of copper in the actuators, thereby decreasing the size, weight, and costs of the actuators. Also, specifically, the SCAs described herein are linear, direct drive SCAs without a transmission gear. Therefore, the embodiments described herein further facilitate decreasing the weight of actuation systems used in mobile and/or translatable machines.

In addition, the SCAs described herein provide for an improved efficiency over that of electromagnetic machines because the losses of the system which include thermal, mechanical, and electromagnetic losses are lower. Specifically, the copper losses in the SCA are smaller than in conventional machines and the dielectric losses can be held small compared to iron losses. Due to the lighter weight and decreased losses, the SCAs described herein demonstrate a high gravimetric power density, i.e., a high power-to-weight ratio. As such, the SCAs described herein provide a light weight, high efficiency linear actuator for applications where the gravimetric power density of the actuator is critical, for example, and without limitation, robotics, aviation, automotive, and wind power applications. Moreover, the SCAs described herein use printed circuit boards to generate the translational forces, thereby increasing the ease of fabrication and assembly of the SCAs while reducing costs.

An exemplary technical effect of the methods, systems, and apparatus described herein includes at least one of (a) increasing the energy efficiency of switched capacitance actuators (SCAs); (b) increasing the energy efficiency of systems through high power SCAs; (c) replacing conventional magnetic field-based actuator devices with SCAs based on a spatial change of electric fields; (d) inducing sufficient torque through high power SCAs without transmission of current continuously; (e) decreasing the weight of the SCAs by eliminating iron cores as magnetic conductors, yokes, and transmission gearing, and significantly decreasing the amount of copper in the SCAs; (f) increasing the force strength of the SCAs by predetermined positioning, orienting, and sizing the stationary electrodes and the translatable electrodes, thereby increasing the associated gravimetric power density; and (g) using printed circuit boards to generate the translational forces, thereby increasing the ease of fabrication and assembly of SCAs.

Exemplary embodiments of switched capacitive devices are described above in detail. The high power SCAs, and methods of operating such systems and devices are not limited to the specific embodiments described herein, but rather, components of systems and/or steps of the methods may be utilized independently and separately from other components and/or steps described herein. For example, the methods may also be used in combination with other systems requiring highly efficient movement of translatable devices, and are not limited to practice with only the systems and methods as described herein. Rather, the exemplary embodiment can be implemented and utilized in connection with many other machinery applications that are currently configured to receive and accept SCAs, e.g., and without limitation, translatable robotic systems in automated assembly facilities.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A switched capacitive device comprising:
   a stationary portion comprising a plurality of first electrodes extending at least partially in a longitudinal dimension, wherein each first electrode of said plurality of first electrodes has a first electrode volume; and
   a translatable portion comprising a plurality of second electrodes proximate to said plurality of first electrodes, wherein each second electrode of said plurality of second electrodes has a second electrode volume, the first electrode volume greater than the second electrode volume, said plurality of second electrodes translatable with respect to said plurality of first electrodes, said plurality of second electrodes extending at least partially in the longitudinal dimension, said plurality of first electrodes configured to induce substantially linear motion of said plurality of second electrodes in the longitudinal dimension through the use of an electric field induced by at least a portion of said plurality of first electrodes, wherein said switched capacitive device is sectionalized into a plurality of unit cells coupled together, and wherein each said unit cell of said plurality of unit cells comprises:
   a section of said stationary portion comprising a portion of said plurality of first electrodes; and
   a section of said translatable portion comprising a portion of said plurality of second electrodes, said section of said translatable portion complementary with, and in opposition to, said section of said stationary portion.

2. The switched capacitive device in accordance with claim 1, wherein:
   said stationary portion comprises a first substrate comprising a first substrate surface; and
   said translatable portion comprises a second substrate comprising a second substrate surface complementary with, and in opposition to, said first substrate surface.

3. The switched capacitive device in accordance with claim 2, wherein:
   said plurality of first electrodes are coupled to said first substrate surface; and
   said plurality of second electrodes are coupled to said second substrate surface.

4. The switched capacitive device in accordance with claim 2, wherein:
   said plurality of first electrodes are at least partially embedded within said first substrate; and
   said plurality of second electrodes are at least partially embedded within said second substrate.

5. The switched capacitive device in accordance with claim 2 further comprising at least one of:
   said stationary portion further comprising at least one layer of at least one first dielectric material formed over at least a portion of said first substrate surface, said plurality of first electrodes at least partially embedded within said at least one layer of at least one first dielectric material; and
   said translatable portion further comprising at least one layer of at least one second dielectric material formed over at least a portion of said second substrate surface, said plurality of second electrodes at least partially embedded within said at least one layer of at least one second dielectric material.

6. The switched capacitive device in accordance with claim 5, wherein said at least one layer of first dielectric material and said at least one layer of second dielectric material define a gap therebetween.

7. The switched capacitive device in accordance with claim 6, wherein said gap is at least partially filled with a dielectric fluid.

8. The switched capacitive device in accordance with claim 5, wherein said each first electrode of said plurality of first electrodes is at least partially embedded within said first substrate and said at least one layer of at least one first dielectric material, thereby defining one of:
   a substantially ovoidal perimeter in a plane at least partially defined by the longitudinal dimension;
   a substantially circular perimeter in a plane at least partially defined by the longitudinal dimension; and
   at least partially rectangular perimeter in a plane at least partially defined by the longitudinal dimension.

9. The switched capacitive device in accordance with claim 5, wherein said each second electrode of said plurality of second electrodes is at least partially embedded within said second substrate and said at least one layer of at least one second dielectric material, thereby defining one of:
   a substantially ovoidal perimeter in a plane at least partially defined by the longitudinal dimension;
   a substantially circular perimeter in a plane at least partially defined by the longitudinal dimension; and at least partially rectangular perimeter in a plane at least partially defined by the longitudinal dimension.

10. The switched capacitive device in accordance with claim 1, wherein at least one unit cell of said plurality of unit cells comprises one of:
said portion of said plurality of first electrodes defines a first number representative of said first electrodes and said portion of said plurality of second electrodes defines a second number representative of said second electrodes, the first number greater than the second number;
said portion of said plurality of first electrodes defines a third number representative of said first electrodes and said portion of said plurality of second electrodes defines a fourth number representative of said second electrodes, the fourth number greater than the third number; and
said portion of said plurality of first electrodes defines a fifth number representative of said first electrodes and said portion of said plurality of second electrodes defines a six number representative of said second electrodes, the fifth number equal to the sixth number.

11. The switched capacitive device in accordance with claim 1, wherein:
said stationary portion comprises a first substrate, said plurality of first electrodes defines a plurality of rows of said plurality of first electrodes extending along said first substrate substantially orthogonal to the longitudinal dimension; and
said translatable portion comprises a second substrate, said plurality of second electrodes defines a plurality of rows of said plurality of second electrodes extending along said second substrate substantially orthogonal to the longitudinal dimension, said plurality of rows of said plurality of second electrodes complementary with, and in opposition to, said plurality of rows of said plurality of first electrodes.

12. The switched capacitive device in accordance with claim 1 further comprising at least one of:
said stationary portion comprising a first substrate, said plurality of first electrodes defines a plurality of rows of said plurality of first electrodes extending along said first substrate at a skewed angle with respect to the longitudinal dimension; and
said translatable portion comprising a second substrate, said plurality of second electrodes defines a plurality of rows of said plurality of second electrodes extending along said second substrate at a skewed angle with respect to the longitudinal dimension.

13. The switched capacitive device in accordance with claim 1 further comprising at least one of:
said stationary portion comprising a first substrate, said plurality of first electrodes defines a plurality of rows of said plurality of first electrodes extending along said first substrate with a substantially serrated pattern with respect to the longitudinal dimension; and
said translatable portion comprising a second substrate, said plurality of second electrodes defines a plurality of rows of said plurality of second electrodes extending along said second substrate with a substantially serrated pattern with respect to the longitudinal dimension.

14. The switched capacitive device in accordance with claim 1, wherein:
said stationary portion comprises a plurality of stationary boards; and
said translatable portion comprises a plurality of translatable boards, wherein said plurality of stationary boards and said plurality of translatable boards are stacked in an alternating manner.

15. The switched capacitive device in accordance with claim 1, wherein said stationary portion is configured to transmit a plurality of sequential voltage signals through said stationary portion, thereby inducing a cyclic linear motion of said translatable portion in the longitudinal direction.

16. A machine comprising:
a body;
at least one electric power source coupled to said body; and
at least one mechanism translatably coupled to said body and comprising at least one switched capacitive device configured to induce movement of said at least one mechanism, said at least one switched capacitive device comprising:
a stationary portion comprising a plurality of first electrodes extending at least partially in a longitudinal dimension, wherein each first electrode of said plurality of first electrodes has a first electrode volume; and
a translatable portion comprising a plurality of second electrodes proximate said plurality of first electrodes, wherein each second electrode of said plurality of second electrodes has a second electrode volume, the first electrode volume greater than the second electrode volume, said plurality of second electrodes translatable with respect to said plurality of first electrodes, said plurality of second electrodes extending at least partially in the longitudinal dimension, said plurality of first electrodes configured to induce substantially linear motion of said plurality of second electrodes in the longitudinal dimension through the use of an electric field induced by at least a portion of said plurality of first electrodes, wherein said at least one switched capacitive device is sectionalized into a plurality of unit cells coupled together, and wherein each said unit cell of said plurality of unit cells comprises:
a section of said stationary portion comprising a portion of said plurality of first electrodes; and
a section of said translatable portion comprising a portion of said plurality of second electrodes, said section of said translatable portion complementary with, and in opposition to, said section of said stationary portion.

17. The machine in accordance with claim 16, wherein said switched capacitive device is sectionalized into a plurality of unit cells coupled together, wherein each unit cell of said plurality of unit cells comprises:
a section of said stationary portion comprising a portion of said plurality of first electrodes; and
a section of said translatable portion comprising a portion of said plurality of second electrodes, said section of said translatable portion complementary with and in opposition to said section of said stationary portion.

18. The machine in accordance with claim 16, wherein:
said stationary portion comprises a first substrate, said plurality of first electrodes defining a plurality of rows extending along said first substrate substantially orthogonal to the longitudinal dimension; and
said translatable portion comprises a second substrate, said plurality of second electrodes defining a plurality of rows extending along said second substrate substantially orthogonal to the longitudinal dimension, said second electrode plurality of rows complementary with, and in opposition to, said first electrode plurality of rows.

19. The machine in accordance with claim 16 further comprising at least one of:
said stationary portion comprising a first substrate, said plurality of first electrodes defines a plurality of rows of said plurality of first electrodes extending along said first substrate at a skewed angle with respect to the longitudinal dimension; and
said translatable portion comprising a second substrate, said plurality of second electrodes defines a plurality of rows of said plurality of second electrodes extending along said second substrate at a skewed angle with respect to the longitudinal dimension.

20. The machine in accordance with claim 16 further comprising at least one of:
said stationary portion comprising a first substrate, said plurality of first electrodes defines a plurality of rows of said plurality of first electrodes extending along said first substrate with a substantially serrated pattern with respect to the longitudinal dimension; and
said translatable portion comprising a second substrate, said plurality of second electrodes defines a plurality of rows of said plurality of second electrodes extending along said second substrate with a substantially serrated pattern with respect to the longitudinal dimension.

21. The machine in accordance with claim 16, wherein:
said stationary portion comprises a plurality of stationary boards; and
said translatable portion comprises a plurality of translatable boards, wherein said plurality of stationary boards and said plurality of translatable boards are stacked in an alternating manner.

22. The machine in accordance with claim 16, wherein said stationary portion is configured to transmit a plurality of sequential voltage signals through said stationary portion, thereby inducing a cyclic linear motion of said translatable portion in the longitudinal direction.

23. A method for converting electrical energy into mechanical energy through a switched capacitive device, the switched capacitive device including a stationary portion and a translatable portion proximate the stationary portion, the switched capacitive device defining a longitudinal dimension, the stationary portion including a plurality of first electrodes extending at least partially in the longitudinal dimension, the translatable portion including a plurality of second electrodes proximate, complementary with, and in opposition to the plurality of first electrodes, the plurality of second electrodes translatable with respect to the plurality of first electrodes, the plurality of second electrodes extending at least partially in the longitudinal dimension, wherein the switched capacitive device is sectionalized into a plurality of unit cells coupled together, and wherein each unit cell of the plurality of unit cells includes a section of the stationary portion including a portion of the plurality of first electrodes and a section of the translatable portion including a portion of the plurality of second electrodes, the section of the translatable portion complementary with, and in opposition to, the section of the stationary portion, said method comprising:
energizing at least a portion of the plurality of first electrodes, wherein each first electrode of the plurality of first electrodes has a first electrode volume;
inducing an electric field about the at least a portion of the first plurality of electrodes, wherein the electric field is further induced about at least a portion of the plurality of second electrodes, wherein each second electrode of the plurality of second electrodes has a second electrode volume, the first electrode volume greater than the second electrode volume; and
inducing linear motion of the translatable portion in the longitudinal direction as a function of the electric field induced by at least a portion of the plurality of first electrodes.

* * * * *